(12) United States Patent
Kikuchi

(10) Patent No.: US 8,930,447 B2
(45) Date of Patent: Jan. 6, 2015

(54) METHOD, APPARATUS, AND PROGRAM FOR USABILITY ANALYSIS OF WEB APPLICATIONS

(75) Inventor: Katsuro Kikuchi, Musashino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/389,451

(22) PCT Filed: Mar. 5, 2010

(86) PCT No.: PCT/JP2010/054161
§ 371 (c)(1),
(2), (4) Date: Feb. 8, 2012

(87) PCT Pub. No.: WO2011/099170
PCT Pub. Date: Aug. 18, 2011

(65) Prior Publication Data
US 2012/0143947 A1    Jun. 7, 2012

(30) Foreign Application Priority Data

Feb. 12, 2010 (JP) ................................ 2010-029031

(51) Int. Cl.
*G06F 15/16* (2006.01)
*G06Q 30/02* (2012.01)

(52) U.S. Cl.
CPC ..................................... *G06Q 30/02* (2013.01)
USPC ........... 709/203; 709/218; 707/737; 707/750; 715/860

(58) Field of Classification Search
None
See application file for complete search history.

(56) References Cited

U.S. PATENT DOCUMENTS

| 6,661,431 | B1 * | 12/2003 | Stuart et al. ................... 715/733 |
| 6,782,423 | B1 * | 8/2004 | Nakayama et al. ........... 709/224 |
| 7,349,827 | B1 * | 3/2008 | Heller et al. ................... 702/186 |
| 8,645,941 | B2 * | 2/2014 | Goulden et al. ............... 717/170 |
| 8,650,587 | B2 * | 2/2014 | Bhatia et al. .................... 725/14 |
| 8,667,074 | B1 * | 3/2014 | Farkas ........................ 709/206 |
| 2002/0147772 | A1 * | 10/2002 | Glommen et al. ............ 709/203 |
| 2002/0184364 | A1 * | 12/2002 | Brebner ........................ 709/224 |
| 2002/0186237 | A1 * | 12/2002 | Bradley et al. ................ 345/736 |
| 2003/0046385 | A1 * | 3/2003 | Vincent ......................... 709/224 |
| 2003/0107575 | A1 * | 6/2003 | Cardno ......................... 345/440 |
| 2003/0154442 | A1 * | 8/2003 | Papierniak ................. 715/501.1 |
| 2003/0163563 | A1 * | 8/2003 | Bean ............................. 709/224 |
| 2003/0163566 | A1 * | 8/2003 | Perkins et al. ................ 709/225 |
| 2003/0167195 | A1 * | 9/2003 | Fernandes et al. ................ 705/8 |
| 2003/0182365 | A1 | 9/2003 | Toda et al. |

(Continued)

FOREIGN PATENT DOCUMENTS

| JP | 10-3410 | 1/1998 |
| JP | 2002-123516 | 4/2002 |

(Continued)

*Primary Examiner* — Ninos Donabed
(74) *Attorney, Agent, or Firm* — Antonelli, Terry, Stout & Kraus, LLP.

(57) ABSTRACT

A usability analysis method of a web application including: a first step of acquiring a page transition log and operation logs on individual pages in the web application; a second step of detecting a segment having a specific page transition pattern in the page transition log; a third step of managing operation logs on individual pages included in the detected page transition pattern in relation to the individual pages; a fourth step of performing statistic processing on the managed operation logs and analyzing page utilization; and a fifth step of analyzing usability based on the page transition pattern and the page utilization.

9 Claims, 21 Drawing Sheets

| TRANSITION PATTERN | | | UTILIZATION INFO | | | ANALYSIS RESULT | |
|---|---|---|---|---|---|---|---|
| PATTERN NAME/ EVALUATION METRICS | DEFAULT THRESHOLD | CONDITION | PAGE/ EVALUATION METRICS | DEFAULT THRESHOLD | CONDITION | TARGET OF IMPROVEMENT | POINTS OF IMPROVEMENT |
| REROUTE/RATE | 30% | EQUAL TO OR MORE | BACK STEP (PAGE)/ STAYING TIME | 3 SEC. | EQUAL TO OR LESS | BRANCH STEP (b) | BRANCH MISTAKE IS CAUSED BY MISLEADING FROM EXPLANATION OR LINK |
| REROUTE/RATE | 30% | EQUAL TO OR MORE | BRANCH STEP (PAGE)/ CONTENT PERUSE RATE | 50% | EQUAL TO OR LESS | BRANCH STEP (b) | BRANCH MISTAKE IS CAUSED BY CONFUSING EXPLANATION |
| REPEAT/RATE | 30% | EQUAL TO OR MORE | REPEAT START STEP (PAGE)/ STAYING TIME | 3 SEC. | EQUAL TO OR LESS | REPEAT END STEP (b) | REPEAT IS CAUSED BECAUSE END STEP CANNOT BE EXECUTED WITHOUT REFERENCE TO START STEP |
| : | : | : | : | : | : | : | : |

(56) References Cited

U.S. PATENT DOCUMENTS

| | | | |
|---|---|---|---|
| 2004/0049366 A1* | 3/2004 | Tanaka et al. | 702/187 |
| 2004/0059746 A1* | 3/2004 | Error et al. | 707/102 |
| 2004/0064443 A1* | 4/2004 | Taniguchi et al. | 707/3 |
| 2004/0098229 A1* | 5/2004 | Error et al. | 702/186 |
| 2004/0122943 A1* | 6/2004 | Error et al. | 709/224 |
| 2004/0205119 A1* | 10/2004 | Streble et al. | 709/203 |
| 2005/0021731 A1* | 1/2005 | Sehm et al. | 709/224 |
| 2006/0248452 A1* | 11/2006 | Lambert et al. | 715/513 |
| 2007/0250468 A1* | 10/2007 | Pieper | 707/1 |
| 2008/0243612 A1* | 10/2008 | Blinnikka | 705/14 |
| 2009/0172021 A1* | 7/2009 | Kane et al. | 707/104.1 |
| 2010/0146110 A1* | 6/2010 | Christensen et al. | 709/224 |
| 2013/0254389 A1* | 9/2013 | Heller et al. | 709/224 |

FOREIGN PATENT DOCUMENTS

| | | |
|---|---|---|
| JP | 2002-175240 | 6/2002 |
| JP | 2002-222098 | 8/2002 |
| JP | 2003-281317 | 10/2003 |
| JP | 2004-102564 | 4/2004 |
| JP | 2004-152209 | 5/2004 |
| JP | 2004-287716 | 10/2004 |

* cited by examiner

FIG. 2A

```
<?xml version="1.0">
<flows>
  <flow>
    <nodes>
      <node id="start"/>
      <node id="end"/>
      <node id="id1" url="URL1"/>
      <node id="id2" url="URL2"/>
      <node id="id3" url="URL3"/>
    </nodes>
    <connects>
      <connect from="start" to="id1"/>
      <connect from="id1" to="id2"/>
      <connect from="id1" to="id3"/>
      <connect from="id2" to="end"/>
      <connect from="id3" to="end"/>
    </connects>
  </flow>
</flows>
```

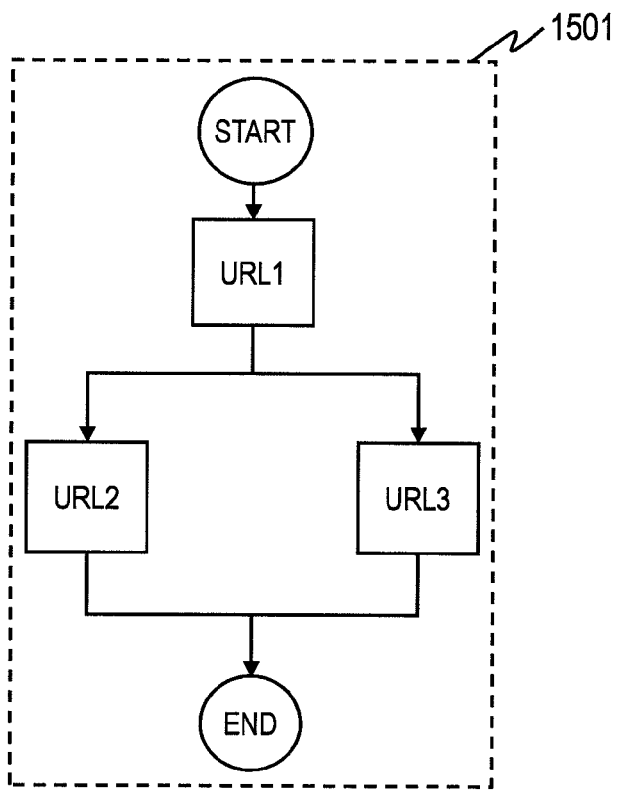

| TASK ID | PAGE ID | OPERATION LOG DATA |
|---------|---------|--------------------|
| XXXX | URL1 | ... |
| YYYY | URL3 | ... |
| ZZZZ | : | ... |
| | | |

| ROUTE ID | ROUTE INFO |
|----------|------------|
| r1 | URL1, URL2 |
| r2 | URL1, URL3 |
| r3 | URL1, URL3, URL1, URL2 |
| : | |

| ROUTE ID | PAGE ID | OPERATION LOG DATA |
|----------|---------|--------------------|
| : | : | : |
| r3 | URL1 | ... |
| r3 | URL3 | |
| r3 | URL1-2 | |
| r3 | URL2 | ... |
| : | | |

| TRANSITION PATTERN DETECTION RULE | NAME |
|---|---|
| aba | REPEAT |
| abac | REROUTE |
| : | |

FIG. 10B

| TRANSITION PATTERN DETECTION RULE | NAME |
|---|---|
| aFbRa | REPEAT |
| aFbRaFc | REROUTE |
| aUb | Jump |
| : | : |

F: FORWARD DIRECTION
R: REVERSE DIRECTION
U: UNDEFINED

FIG. 12A

| PATTERN ID | ROUTING INFO |
|---|---|
| p1 | URL1, URL2 |
| p2 | URL1, URL3 |
| p3 | URL1, URL3, URL1, URL2 |
| : | |

FIG. 12B

| PATTERN ID | PAGE ID | OPERATION LOG DATA | PAGE UTILIZATION INFO |
|---|---|---|---|
| : | : | : | : |
| p3 | URL1 | ... | ... |
| p3 | URL3 | | |
| p3 | URL1-2 | | |
| p3 | URL2 | ... | ... |
| : | | | |

FIG. 14

| TRANSITION PATTERN | | | UTILIZATION INFO | | | ANALYSIS RESULT | |
|---|---|---|---|---|---|---|---|
| PATTERN NAME/ EVALUATION METRICS | DEFAULT THRESHOLD | CONDITION | PAGE/ EVALUATION METRICS | DEFAULT THRESHOLD | CONDITION | TARGET OF IMPROVEMENT | POINTS OF IMPROVEMENT |
| REROUTE/RATE | 30% | EQUAL TO OR MORE | BACK STEP (PAGE)/ STAYING TIME | 3 SEC. | EQUAL TO OR LESS | BRANCH STEP (b) | BRANCH MISTAKE IS CAUSED BY MISLEADING FROM EXPLANATION OR LINK |
| REROUTE/RATE | 30% | EQUAL TO OR MORE | BRANCH STEP (PAGE)/ CONTENT PERUSE RATE | 50% | EQUAL TO OR LESS | BRANCH STEP (b) | BRANCH MISTAKE IS CAUSED BY CONFUSING EXPLANATION |
| REPEAT /RATE | 30% | EQUAL TO OR MORE | REPEAT START STEP (PAGE)/ STAYING TIME | 3 SEC. | EQUAL TO OR LESS | REPEAT END STEP (b) | REPEAT IS CAUSED BECAUSE END STEP CANNOT BE EXECUTED WITHOUT REFERENCE TO START STEP |
| .. | | | .. | | | .. | |

METHOD, APPARATUS, AND PROGRAM FOR USABILITY ANALYSIS OF WEB APPLICATIONS

BACKGROUND OF THE INVENTION

This invention relates to a method for usability analysis of web applications and, in particular, relates to a technique for analyzing usability of a web application which involves page transitions based on a workflow.

In recent years, a variety of services and works have been implemented in web applications. Improvement in performance of client terminals and server devices and advancement in web technologies, as seen in AJAX (Asynchronous JavaScript+XML), have brought web applications involving not simple page transitions, represented by Google Maps, into practical use.

Furthermore, an approach to supporting routine works that follow predetermined procedures has been tried with web applications. Such a web application provides a flowchart image for indicating a workflow and a guide image for supporting operations at each step of the workflow. A user manipulates the guide image, following the workflow indicated in the flowchart image, to pursue the routine work.

In general, it is demanded for a web application that even a user with low IT literacy can make full use of it. The usability level of the web application significantly affects working efficiency; therefore, high usability is demanded for a web application.

The first thing to improve the usability of a web application is to grasp the actual conditions. The next thing is to analyze the conditions to improve the web application based on the result of the analysis. To grasp the conditions, there are two techniques: determining page transitions and determining utilization of pages.

To determine page transitions, there exist several techniques: a technique to determine whether a user is lost the way in page transitions (refer to JP 2003-281317A), a technique to determine a route accessed with high frequency (refer to JP 2004-152209 A), and a technique to check whether pages are accessed as desired by the producer (refer to JP 2002-123516 A).

CITATION LIST

Patent Literature 1: JP2003-281317A
Patent Literature 2: JP2004-152209A
Patent Literature 3: JP2002-123516A

SUMMARY OF THE INVENTION

The techniques disclosed in JP2003-281317A, JP2004-152209A, and JP2002-123516A are to be applied to web applications which simply repeat page transitions. For this reason, it was sufficient that they merely determine the utilization of pages or transitions of pages. In the case of a web application involving page transitions based on a workflow, however, it is necessary to consider the relationship between page transitions leading to the efficiency of the workflow and utilization of pages leading to the efficiency of operations at work steps in the workflow.

To improve the usability, the following operations with logs indicating page utilization by a plurality of users and page transitions are required: (1) detecting transition patterns which are likely to be problems (such as returning, repeating, jumping, and rerouting) from the page transition patterns (routes), (2) listing pages which are likely to be problems, and (3) analyzing the utilization of the pages (operation logs) through, for example, statistical processing. In particular, the operation of step (2) requires the pages to be extracted for each transition pattern. The same page may appear at a plurality of points in a transition pattern; then, the page must be regarded as different pages. This may happen in rerouting; a branch page appears twice: at the first branch and a branch under rerouting. These two branches should be regarded as different pages to be managed in consideration of the order of appearance in analyzing operation logs. Accordingly, it has been difficult for an inexperienced analyst to determine the usability of a web application within a short time by analyzing only operation logs.

This invention is to solve the aforementioned problem and an object of this invention is to provide a method for usability analysis of web applications which can reliably analyze the usability of a web application involving page transitions.

An representative example of the invention disclosed in this application is a usability analysis method of a web application including: a first step of acquiring a page transition log and operation logs on individual pages in the web application; a second step of detecting a segment having a specific page transition pattern in the page transition log; a third step of managing operation logs on individual pages included in the detected page transition pattern in relation to the individual pages; a fourth step of performing statistic processing on the managed operation logs and analyzing page utilization; and a fifth step of analyzing usability based on the page transition pattern and the page utilization.

A representative embodiment of this invention provides reliable analysis on the usability of a web application in consideration of correlations between transitions and utilization of pages.

BRIEF DESCRIPTION OF THE DRAWINGS

FIG. 2A is a drawing illustrating exemplary workflow definition data in the embodiment;

FIG. 2B is a drawing illustrating an exemplary workflow in the embodiment;

FIG. 7 is a drawing illustrating an exemplary current task operation log table in the embodiment;

FIG. 8A is a drawing illustrating an exemplary route management table in the embodiment;

FIG. 8B is a drawing illustrating an exemplary operation log table in the embodiment;

FIG. 10A is a drawing illustrating an exemplary transition pattern detection rule table in the embodiment;

FIG. 10B is a drawing illustrating another exemplary transition pattern detection rule table in the embodiment;

FIG. 12A is a drawing illustrating an exemplary transition pattern table for managing segmental transition logs in the embodiment;

FIG. 12B is a drawing illustrating an exemplary operation log per transition pattern management table in the embodiment;

FIG. 14 is a drawing illustrating an exemplary utilization analysis policy table in the embodiment;

DETAILED DESCRIPTION OF THE EMBODIMENTS

Hereinafter, an embodiment of this invention will be described with reference to the accompanying drawings. In this description, function blocks implemented by programs executed by processors in a computer system are expressed as modules or units.

Figure 1A:
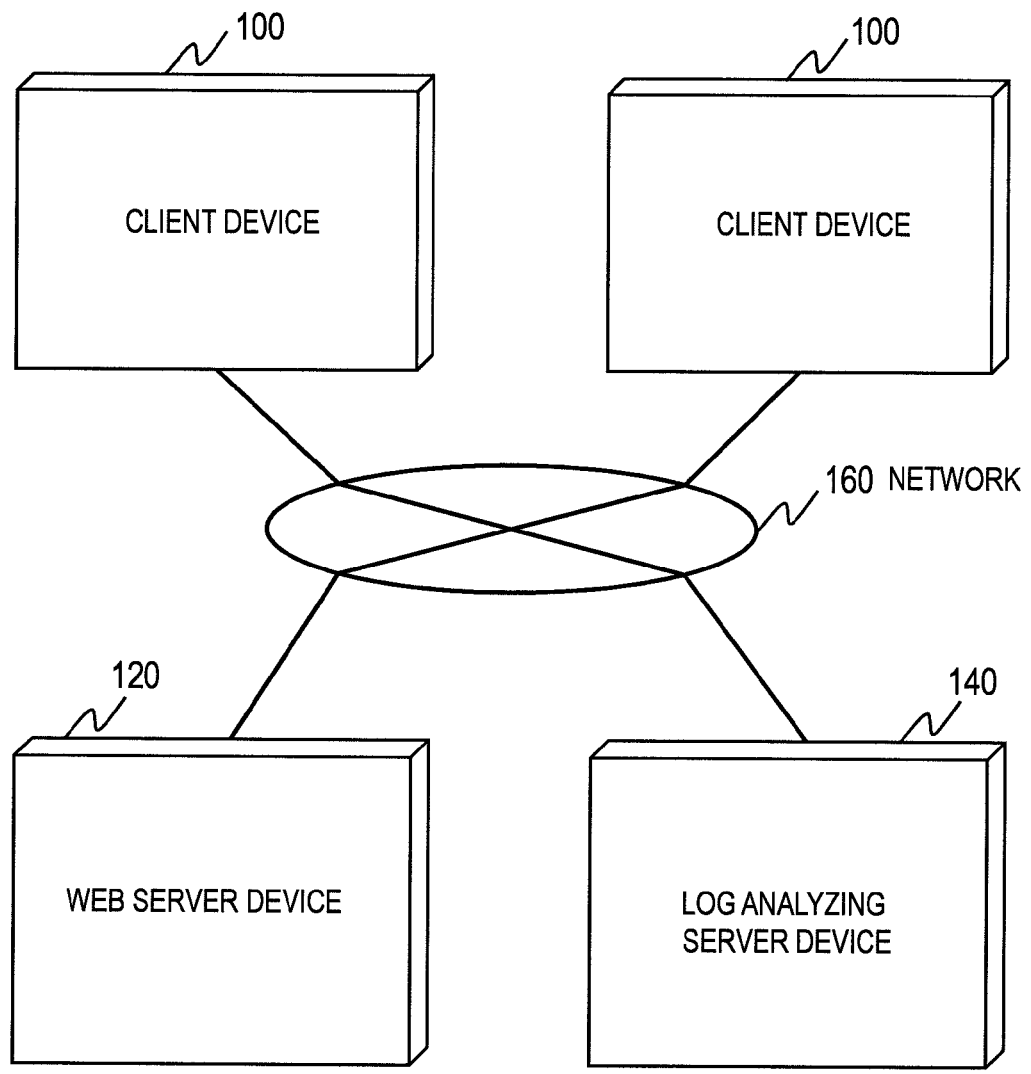
FIG. 1A is a drawing illustrating an exemplary system configuration of a computer system in an embodiment of this invention.
Figure 1B:
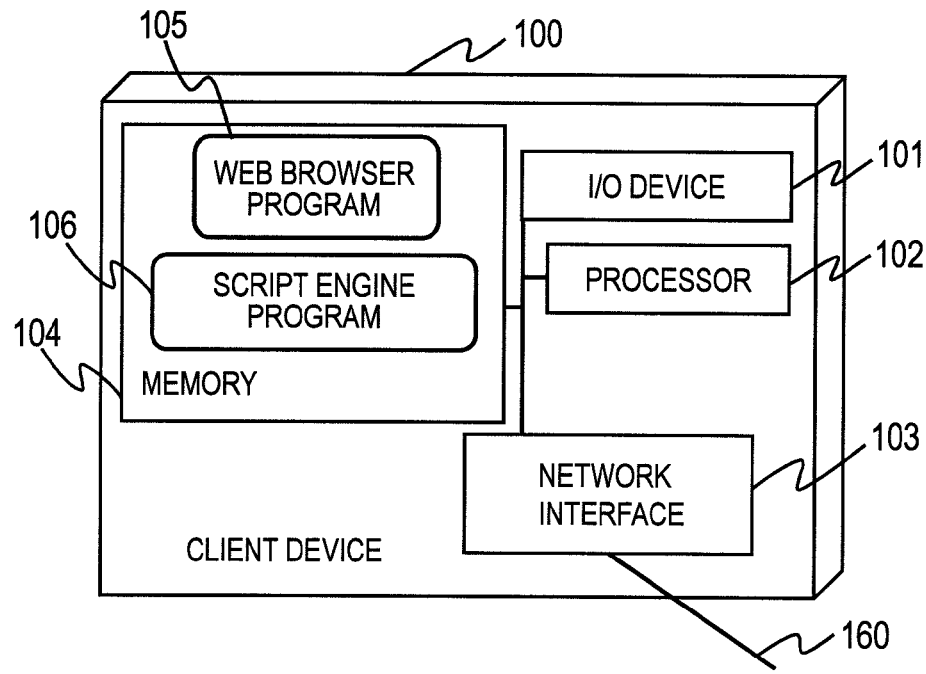
FIG. 1B is a drawing illustrating an exemplary configuration of a client device in the embodiment.
Figure 1C:
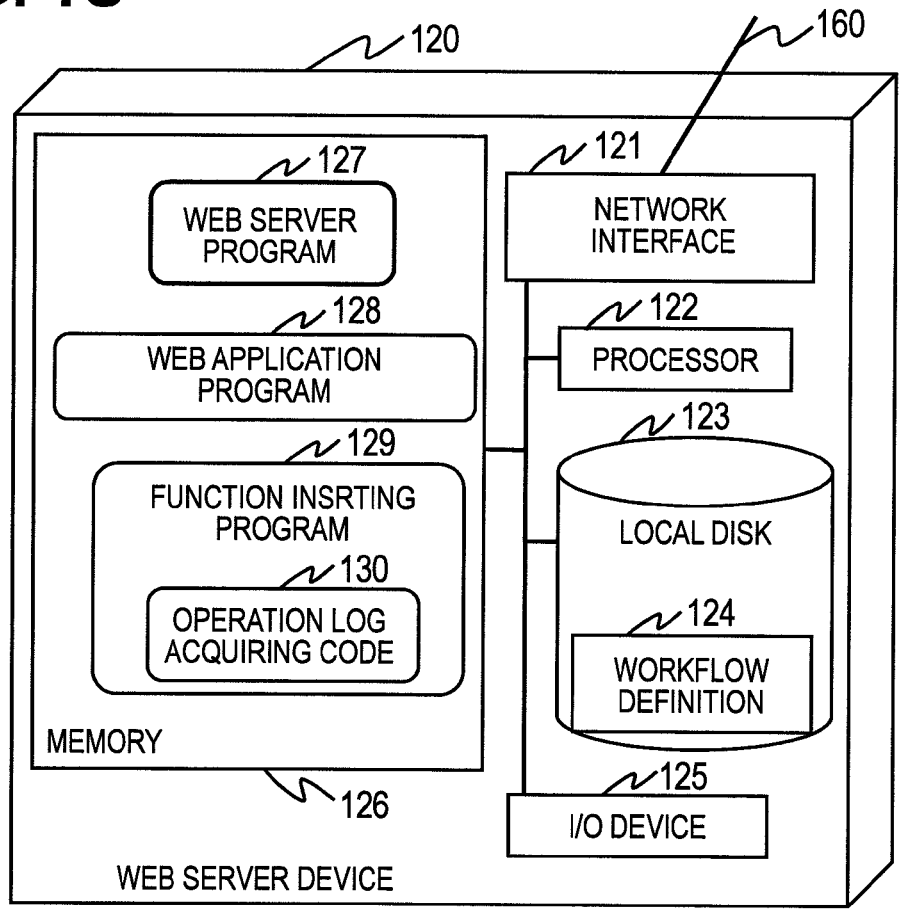
FIG. 1C is a drawing illustrating an exemplary configuration of a web server device in the embodiment.
Figure 1D:
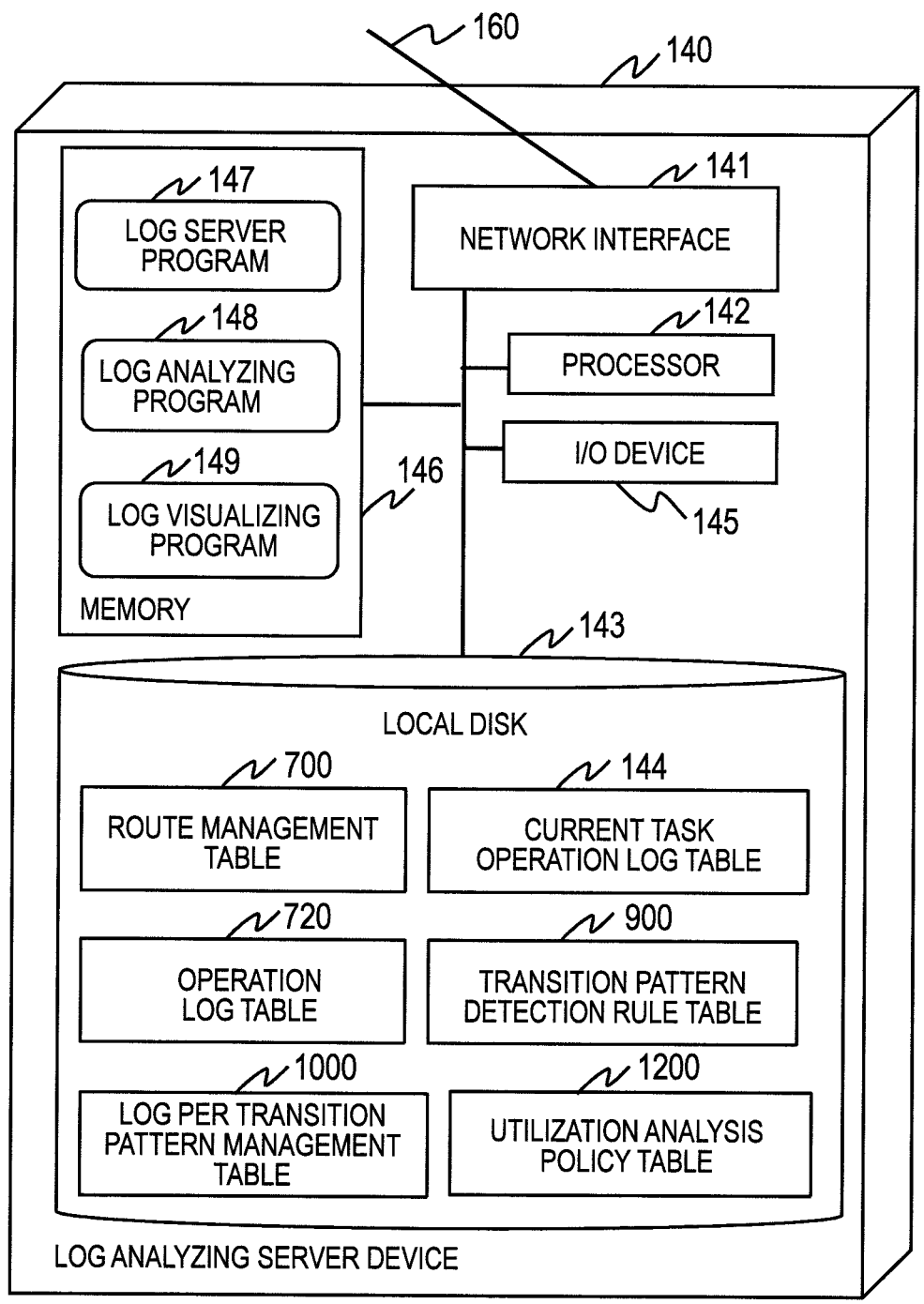
FIG. 1D is a drawing illustrating an exemplary configuration of a log analyzing server device in the embodiment.

Hereinafter, with reference to FIGS. 1A to 18, an embodiment of this invention will be described.
System Configuration FIG. 1A illustrates an exemplary configuration of a computer system 1 in this embodiment. FIG. 1B illustrates an exemplary configuration of a client device 100 in this embodiment. FIG. 1C illustrates an exemplary configuration of a web server device 120 in this embodiment. FIG. 1D illustrates an exemplary configuration of a log analyzing server device 140 in this embodiment.

The computer system 1 shown in FIG. 1A includes one or more (two in FIG. 1A) client devices 100, one or more (one in FIG. 1A) web server devices 120, and one or more (one in FIG. 1A) log analyzing server devices 140. The client devices 100, the web server device 120, and the log analyzing server device 140 are interconnected via a network 160. It should be noted that the web server device 120 and the log analyzing server device 140 may be physically implemented in the same device.

The client device 100 shown in FIG. 1B is a computer that uses web applications provided by the web server device 120. This client device 100 includes an I/O (input and output) device 101, a processor 102, a network interface 103, and a memory 104.

The I/O device 101 is an input device (such as a keyboard or a mouse) and an output device (such as a display device) for providing a user interface. The processor 102 executes a web browser program 105, a script engine program 106, and a not-shown OS (operating system) stored in the memory 104.

The network interface 103 is a communication interface for the client device 100 to communicate data via the network 160. The memory 104 stores programs to be executed by the processor 102 and data to be used by these programs. The client device 100 may further include an external storage device (not shown).

The web server device 120 shown in FIG. 1C is a computer that provides the client devices 100 with services of applications. The web server device 120 includes a network interface 121, a processor 122, a local disk 123, an I/O device 125, and a memory 126.

The network interface 121 is a communication interface for the web server device 120 to communicate data via the network 160. The processor 122 executes a web server program 127, a web application program 128, and a function inserting program 129 stored in the memory 126. Details of the operation of these programs will be described later. The web application program 128 in this description is a workflow-oriented web application program involving page transitions based on a workflow. The information defining the workflow is a workflow definition 124, which is held in the local disk 123. The workflow definition 124 is sufficient as long as it includes definition information of the workflow; it may be held in a different server such as a database server or a different storage device.

The local disk 123 is a storage device composed of, for example, a magnetic disk device and a non-volatile semiconductor memory. The local disk 123 may be mounted in the web server device 120 or may be an external storage device disposed outside the web server device 120.

The I/O device 125 is an input device (such as a keyboard or a mouse) and an output device (such as a display device) for providing a user interface. The web server device 120 does not need to have the I/O device 125. In such a case, the web server device 120 is operated by the client device 100. The memory 126 stores programs executed by the processor 122 and data used by these programs.

FIG. 2A illustrates exemplary workflow definition data 1500 in this embodiment. FIG. 2B illustrates an exemplary workflow 1501 in this embodiment. The workflow definition 124 in FIG. 1C is data in an original XML (eXtensible Markup Language) format like the workflow definition data 1500 shown in FIG. 2A. This workflow definition data 1500 defines a workflow with a flow element. Specifically, node elements define a plurality of work steps which constitute the workflow and connect elements define the connections of the work steps. Each node element is composed of an id attribute specifying the identifier of the node and a URL attribute specifying the URL (Universal Resource Location) for the relevant web page. In this example, the node elements having id attributes of start and end are special nodes in the system definition representing the start step and the end step of this workflow. Each connect element is composed of a from-attribute specifying from which node (from) the step is connected and a to-attribute specifying to which node (to). The workflow definition data 1500 shown in FIG. 2A defines the workflow 1501 shown in FIG. 2B with these elements. Although the workflow is defined in an original XML format in this embodiment, it can be expressed in any format as long as URLs and the sequence of the plurality of work steps that constitute the workflow can be taught.

The log analyzing server device 140 shown in FIG. 1D analyzes page transition logs of applications running on the web browsers in the client devices 100 and user operation logs on individual pages. The log analyzing server device 140 includes a network interface 141, a processor 142, a local disk 143, an I/O device 145, and a memory 146.

The network interface 141 is a communication interface for the log analyzing server device 140 to communicate data via the network 160. The processor 142 executes a log server program 147, a log analyzing program 148, and a log visualizing program 149 stored in the memory 146. The local disk 143 is a storage device composed of, for example, a magnetic disk device and a non-volatile semiconductor memory; it stores a route management table 700, an operation log table 720, a log per transition pattern management table 1000, a current task operation log table 144, a transition pattern detection rule table 900, and a utilization analysis policy table 1200. The local disk 143 may be mounted in the log analyzing server device 140 or may be an external storage device disposed outside the log analyzing server device 140. Details of operations of the programs and configurations of the tables will be described later.

The I/O device 145 is an input device (such as a keyboard and a mouse) and an output device (such as a display device) for providing a user interface. The log analyzing server device 140 does not need to include the I/O device 145. In such a case, the log analyzing server device 140 is operated by a client device 100. The memory 146 stores programs to be executed by the processor 142 and data to be used by these programs.

Outline of Operation of Computer System 1

Figure 3:
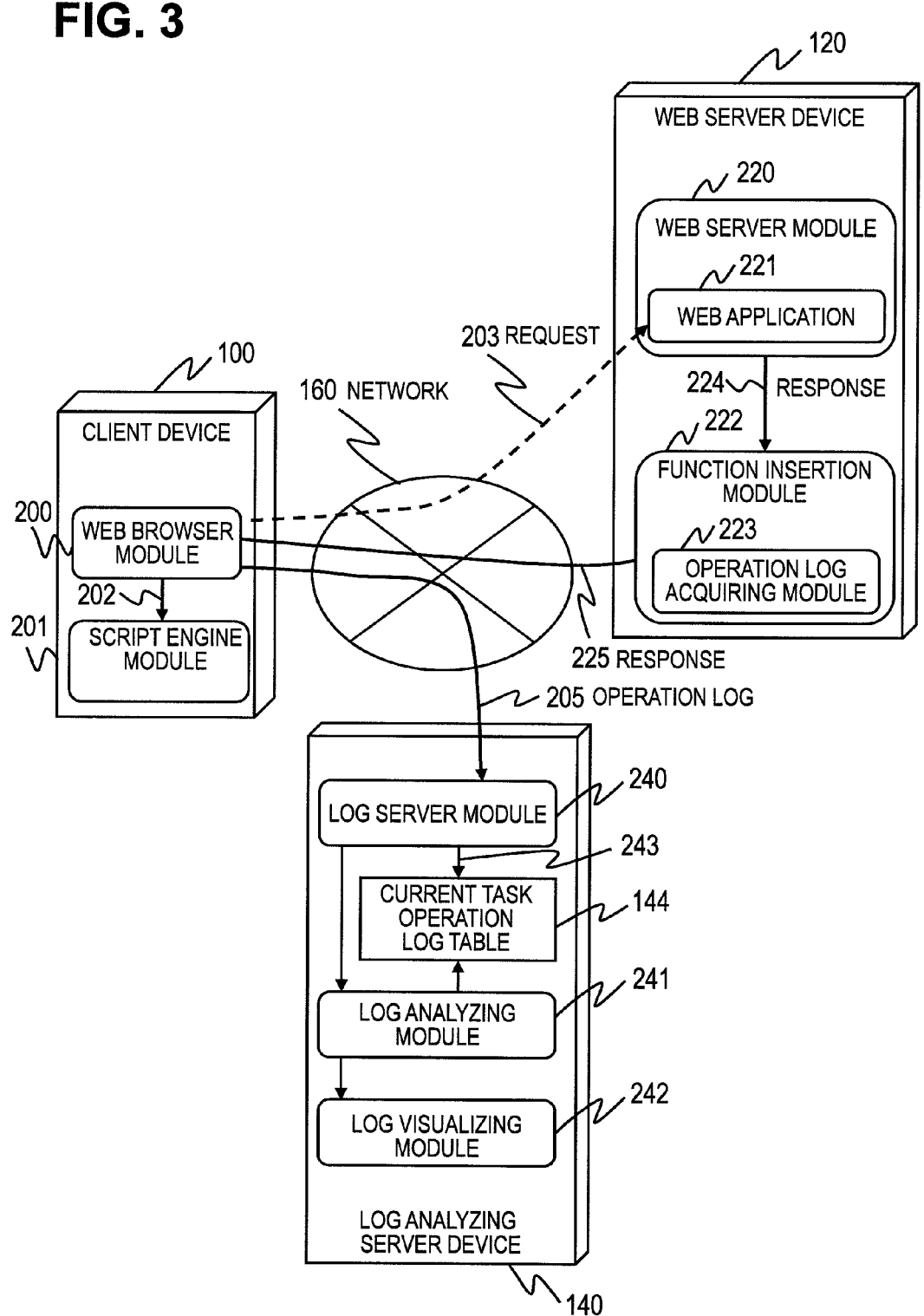
FIG. 3 is a drawing illustrating an outline of operation of the computer system in the embodiment.

FIG. 3 illustrates an outline of operation of the computer system 1 in this embodiment. In the following description, the state in which a program is loaded to the memory in the device 100, 120, or 140 and is being executed by the processor is expressed as module.

In response to a user operation to the web browser, the web browser module 200 sends a request 203 in accordance with the user operation. The request 203 is transmitted via a typical HTTP (Hyper Text Transfer Protocol) protocol, although the protocol for the request 203 is not limited to the HTTP protocol.

Upon receipt of the request 203, a web server module 220 requests a web application 221 relevant to the received request 203 to perform processing. The web application 221 performs processing in accordance with the request 203 to create a response 224 and transfers the created response 224 to a function inserting module 222. The function inserting module 222 incorporates an operation log acquiring module 223 into the transferred response 224 to create a response 225 and sends the created response 225 to the web browser module 200. The operation log acquiring module 223 is incorporated with a response filtering function included in the web server device 120, such as ServletFilter function of Java EE, ISAPI (Internet Server Application Programming Interface) filter function of IIS (Internet Information Services). In this embodiment, the operation log acquiring module 223 is dynamically incorporated by the function inserting module 222; however, the operation log acquiring module 223 may be incorporated in the web application 221 in advance, without using the function inserting module 222.

Upon receipt of the response 225 from the function inserting module 222, the web browser module 200 interprets the HTML (Hyper Text Markup Language) data in the received response 225 and displays the result on the web browser. It further transfers the operation log acquiring module 223 incorporated in the response 225 to a script engine module 201 (202). The operation log acquiring module 223 performs required initialization, and then, acquires information on the user operation on the web browser in the client device 100 in the form of an operation log. The web browser module 200 sends the operation log 205 acquired by the operation log acquiring module 223 to the log server module 240 in the log analyzing server device 140 when a page transition occurs to the web browser, for example. It should be noted that the page transition may be a page transition with or without communication via a network involved. The latter page transition without communication can be detected in rewriting a page in the web browser using a DOM (Document Object Model) or JavaScript technology.

Every time the log server module 240 receives an operation log 205 from the web browser module 200, the log server module 240 stores the received operation log 205 to the current task operation log table 144 (243). The current task operation log table 144 is a table for temporarily storing operation logs for a unit of work defined by the web application 221 being operated in the client device 100 (for example, from the start to the end of a workflow or from a log-in to a log-out, which is referred to as current task). When a current task is finished, information to be stored in the route management table 700 and the operation log table 720 is created based on the operation logs 205 held in the current task operation log table 144 and is appended to the tables.

The log analyzing module 241 integrally analyzes page transitions and user operations in individual pages based on the data held in the current task operation log table 144, the route management table 700, and the operation log table 720. The log visualizing module 242 visualizes problems in usability in accordance with the result of the analysis by the log analyzing module 241.

The log analyzing module 241 executes such processing responsive to an instruction from an administrative user or in a batch at an appropriate time.

Module Configuration of Log Analyzing Server Device 140

Figure 4:
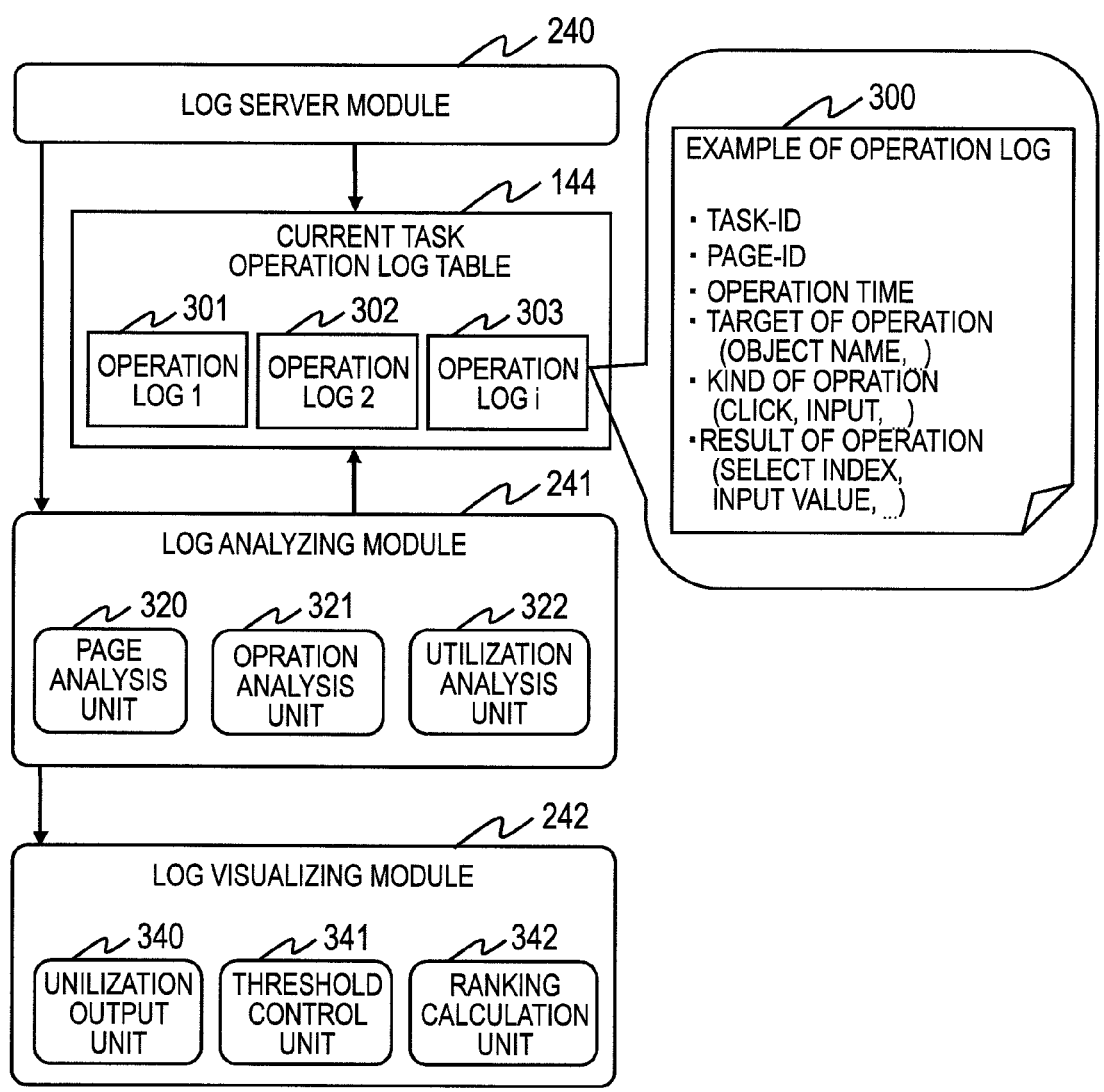
FIG. 4 is a drawing illustrating an exemplary module configuration of the log analyzing server device in the embodiment.

FIG. 4 illustrates an exemplary module configuration of the log analyzing server device 140 in this embodiment. FIG. 4 also shows operations logs 301, 302 and 303 held in the current task operation log table 144 by way of example. The current task operation log table 144 holds operation logs 301, 302, and 303. It should be noted that each of the operation logs may be generally referred to as operation log 300 if the operation logs 301, 302, and 303 do not need to be distinguished from one another. The operation log 300 corresponds to the operation log 205 shown in FIG. 3. The operation log 300 includes a task ID, which is the identifier of the current task, a page ID, which is the identifier of a page referred to in the current task, an operation time, which is the time a user performs operation on the page identified with the page ID, the target of operation (such as an object name), which is a target of the operation by the user, the kind of operation (such as click and input), which is the kind of the operation by the user, and the result of operation (such as select index and input value), which is the result of the operation by the user. As shown in the drawing, the current task operation log table 144 stores a plurality of operation logs 300. The above-mentioned user operation on a page is sufficient if the operation on the page can be analyzed and all the items do not need to be recorded. For example, for analysis based on only the number of clicks, the operation of click may be sufficient for the kind of operation to be recorded.

The log analyzing module 241 includes a page analysis unit 320, an operation analysis unit 321, and a utilization analysis unit 322. The page analysis unit 320 analyzes page transitions. Specifically, the page analysis unit 320 refers to the transition pattern detection rule table 900 to detect a specific transition pattern (such as return, repeat, jump, or reroute) which could be a problem. The operation analysis unit 321 analyzes user operation (such as a click of a mouse and typing in a form) on each page in the web browser. Concurrently, it manages related operation logs 300 for each transition pattern and each position in the order of appearance of pages in each transition pattern to analyze the operations. The utilization analysis unit 322 refers to the results of analysis by the page analysis unit 320 and the operation analysis unit 321 and policy definitions in the utilization analysis policy table 1200 to analyze utilization of each page. The utilization analysis unit 322 detects a problem on usability of the web application based on the result of the analysis on the utilization of the web pages. The page analysis unit 320, the operation analysis unit 321, and the utilization analysis unit 322 are executed in this order when the log analyzing module 231 is executed.

The log visualizing module 242 includes a utilization output unit 340, a threshold control unit 341, and a ranking calculation unit 342. The utilization output unit 340 outputs the result of analysis by the utilization analysis unit 322. The output in this example means to create data to be outputted in the form of a table or to be displayed on a window of the web application in overlay display. The threshold control unit 341 controls the thresholds for conditional expressions defined in the utilization analysis policy table 1200 (refer to the thresholds 1203 and 1212 in FIG. 14) to be the optimum for the web application of the analysis object. The ranking calculation unit 342 quantitatively analyzes adaptability to the policy definitions defined in the utilization analysis policy table 1200 and, if the analysis results in a plurality of problems in some policy, it calculates their ranks (priority degrees to solve the problems). For example, the quantitative analysis of adaptability defines that, if the condition is "equal to or lower", a smaller value indicates higher adaptability and, if the condition is "equal to or higher", a greater value indicates higher adaptability.

Operation of the System

Figure 5A:
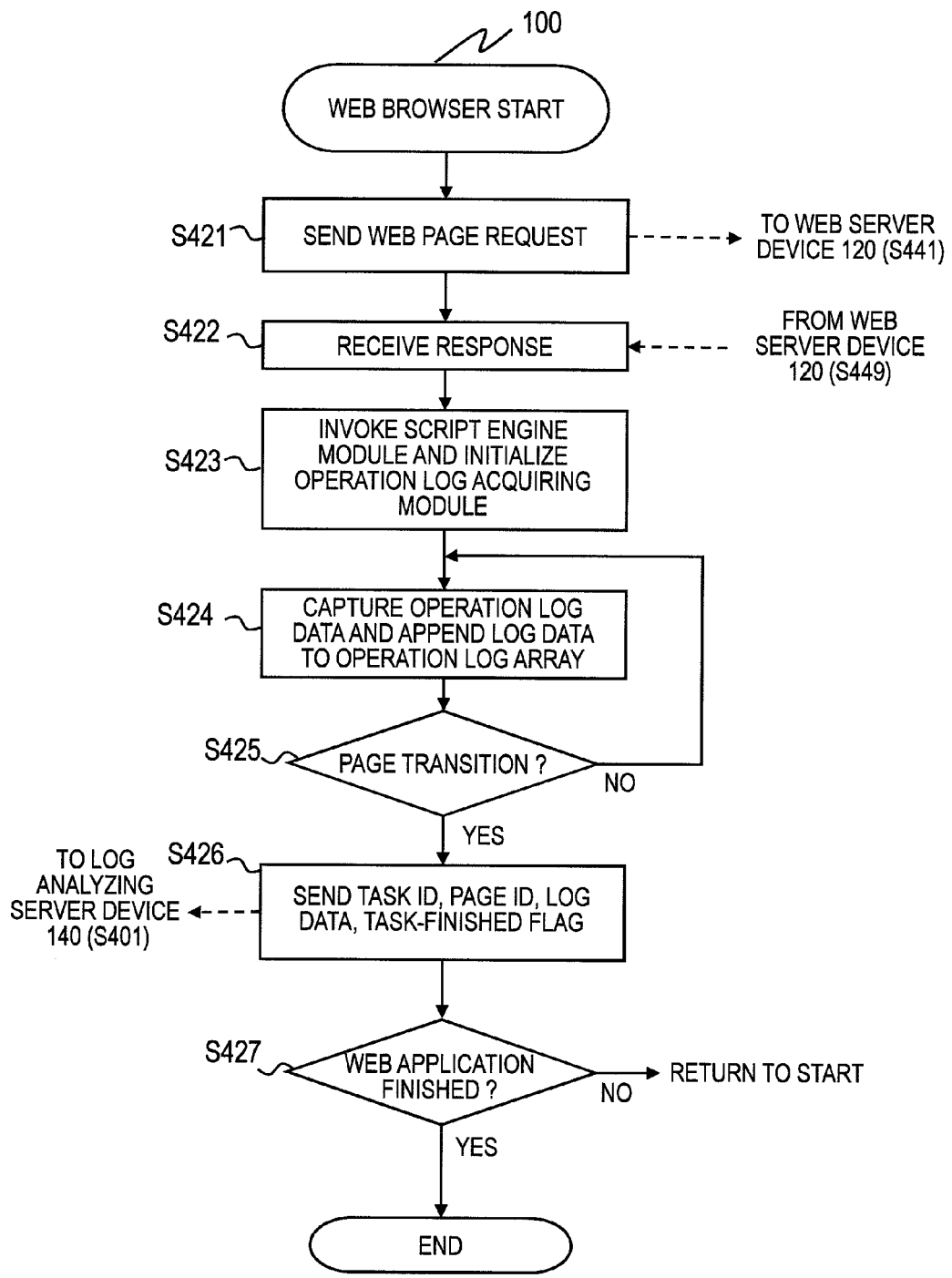
FIG. 5A is a flowchart illustrating exemplary operation of the client device in the computer system in the embodiment.
Figure 5B:
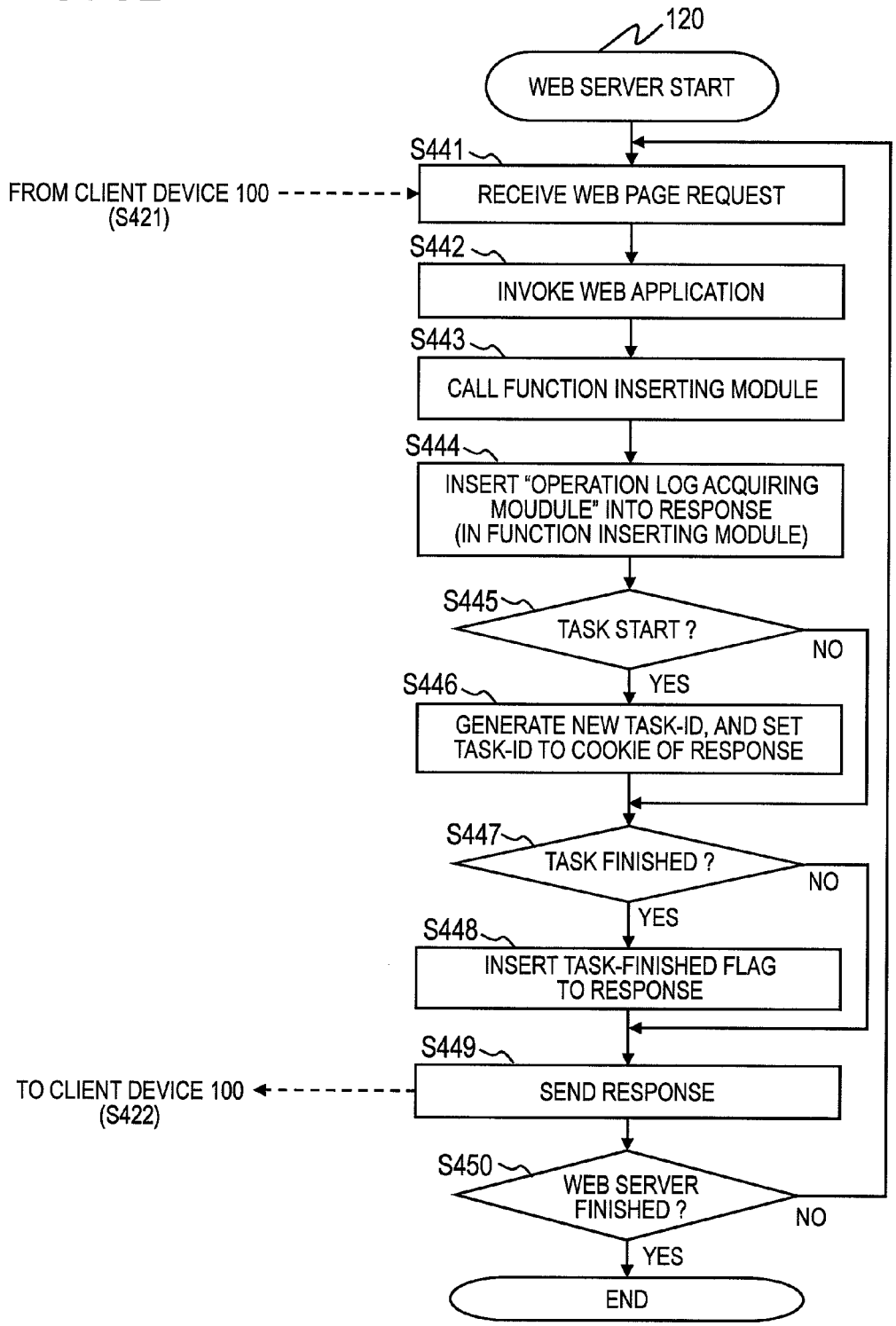
FIG. 5B is a flowchart illustrating exemplary operation of the web server device in the computer system in the embodiment.
Figure 5C:
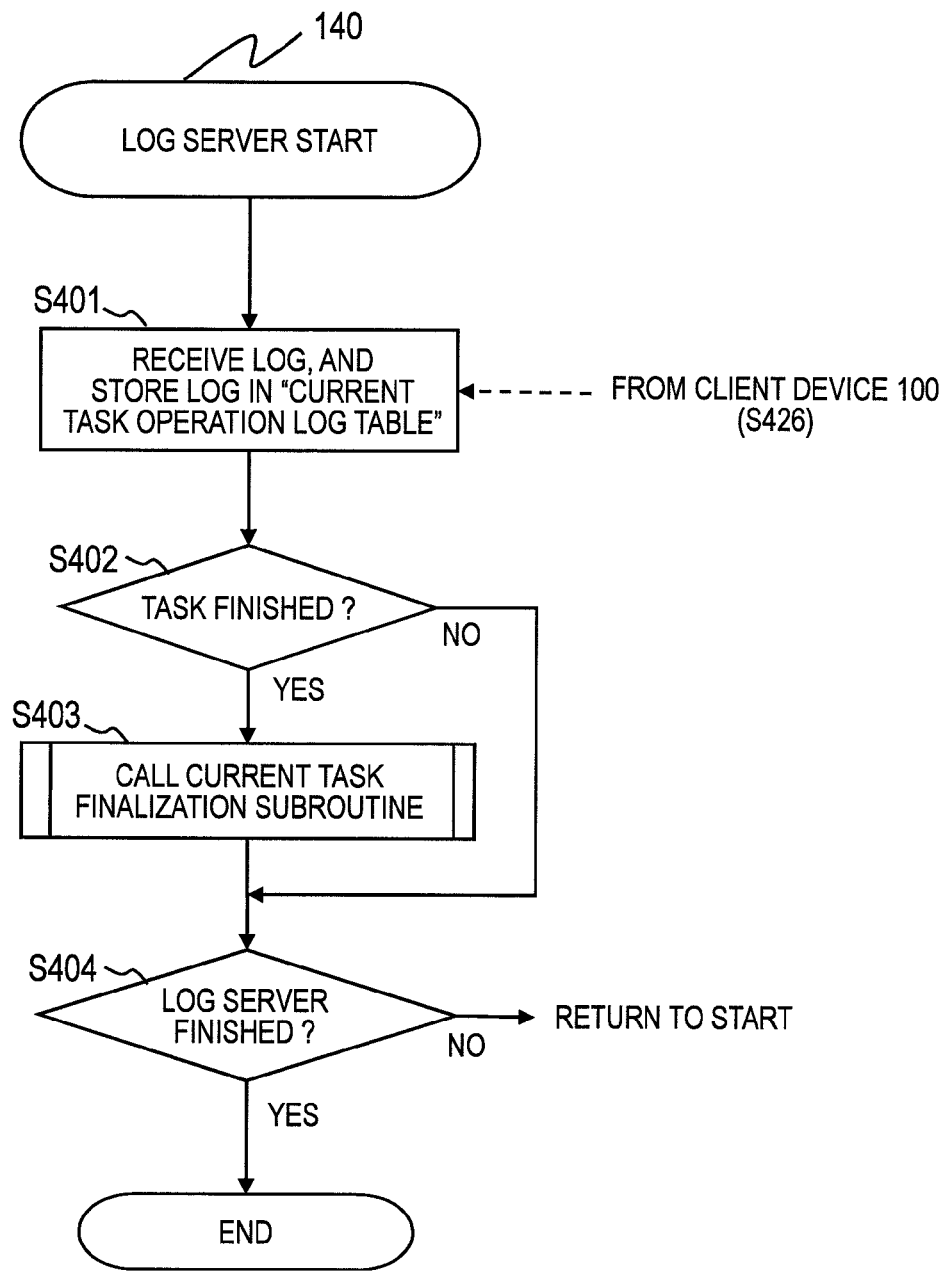
FIG. 5C is a flowchart illustrating exemplary operation of the log analyzing server device in the computer system in the embodiment.

FIG. 5A is a flowchart illustrating exemplary operation of the client device 100 in the computer system 1 in this embodiment. FIG. 5B is a flowchart illustrating exemplary operation of the web server device 120 in the computer system 1 in this embodiment. FIG. 5C is a flowchart illustrating exemplary operation of the log analyzing server device 140 in the computer system 1 in this embodiment.

First, the web browser module 200 sends a request to show a web page to the web server device 120 (S421). Upon receipt of the page request from the client device 100 (S441), the web server module 220 invokes a web application 221 relating to the page request (S442). Next, the web application 221 performs processing responsive to the page request received at step S441 to create a response and transfers the created response to the function inserting module 222 (S443).

The function inserting module 222 inserts the operation log acquiring module 223 into the transferred response (S444). The step S444 can be performed with a response filtering function, such as the ServletFilter of Java EE™, included in the web server device 120.

Next, if the page request received at step S441 indicates start of a task (YES at S445), the function inserting module 222 proceeds to step S446. It generates a new task ID and sets the task ID to the Cookie of the response (S446). If the received page request indicates finish of a task (NO at S445 and YES at S447), the function inserting module 222 proceeds to step S448. It inserts a flag indicating finish of a task to the response (S448). Then, the function inserting module 222 sends the response to the client device 100 (S449).

The start and the finish of a task appearing at step S445 and S447 can be determined based on a request for the start or finish of the task or an event of pressing a specific button. The web server 120 continues processing from step S441 to S449 until the web server device 120 stops its operation (S450).

The processing from step S443 to S449 uses the response filtering function included in the web server device 120, but the web application 221 may include a program fragment to perform the above-described function in advance.

Upon receipt of the response from the web server device 120 (S422), the web browser module 200 invokes the script engine module 201 and initializes the operation log acquiring module 223 (S423). In the initialization at step S423, the web browser module 200 sets an event listener for monitoring events of user operations on the web browser module 200. The operation log acquiring module 223 captures operation log data of a user operation on the web browser module 200 and appends the log data to an operation log array for temporarily toring log data in the web browser module 200 (S424). Step S424 is repeated until an event of page transition occurs (S425).

Upon occurrence of an event of page transition (S425), the web browser module 200 sends values of the task ID, the page ID, the operation log 300, and the task-finished flag to the log analyzing server device 140 (S426). The client device 100 continues processing from steps S421 to S426 until the web application running on the client device 100 is finished (S427). In this embodiment, operation log data for a page is bunched into an operation log to be sent to the log analyzing server device 140, but the log data may be sent every time it is captured or in a bunch of a different unit.

The log server module 240 in the log analyzing server device 140 receives the operation log from the client device 100 and stores it in the current task operation log table 144 (S401). Subsequently, it ascertains whether the current task is finished with reference to the task-finished flag (S402). If the current task is finished (YES at S402), it performs current task finalization subroutine (S403). Details of step S403 will be described later. If the current task is not finished (NO at S402), the log server module 240 returns to step S401 and continues processing until the log analyzing server device 140 stops its operation (S404).

Current Task Finalization Subroutine

Before explaining the current task finalization subroutine, configurations of the current task operation log table 144, the route management table 700, and the operation log table 720 will be described.

FIG. 7 illustrates an exemplary current task operation log table 144 in this embodiment; FIG. 8A illustrates an exemplary route management table 700 in this embodiment; and FIG. 8B illustrates an exemplary operation log table 720 in this embodiment.

As described previously, the current task operation log table 144 shown in FIG. 7 is a table for storing logs of user operations on the web browser in the client device 100. The current task operation log table 144 stores task IDs 601, page IDs 602, and operation log data 603 in relation to one another.

The task IDs 601 are identifiers for uniquely identifying tasks. The page IDs are identifiers for uniquely identifying pages. The operation log data 603 indicates operations on the pages identified with the page IDs 602.

The route management table 700 shown in FIG. 8A is a table for managing information on routes (courses) indicating transitions of web pages. The route management table 700 manages route IDs 701 and routing (course) information 702 indicating transitions of web pages in relation to each other.

The route IDs 701 are identifiers for uniquely identifying routes indicating transitions of web pages. The routing information 702 indicates transitions of web pages in the routes identified with the route IDs 701.

The operation log table 720 shown in FIG. 8B is a table for managing operation log data in relation to the individual pages in routing information managed by the route management table 700. The operation log table 720 manages route IDs 721, page IDs 722, and operation log data 723 in relation to one another.

The route IDs 721 are identifiers for uniquely identifying routes and the same identifiers as the route IDs 701 in the route management table 700 are used. The page IDs 722 are identifiers for uniquely identifying pages and the same identifiers as the page IDs 602 in the current task operation log table 144 are used. The operation log data 723 indicates operations on the pages identified with the page IDs 722.

In the case where the same page appears in a single route for a plurality of times, the page is regarded as different pages to manage the operation log data. In FIG. 8A, URL1 appears twice in the route ID r3, but the second URL1 is identified as URL1-2 in FIG. 8B. This example represents an aforementioned reroute operation. The data for the page IDs 602 in FIG. 7, the routing information 702 in FIG. 8A, and the page IDs 722 in FIG. 8B may be data with or without communication via a network involved.

Now, the current task finalization subroutine will be explained.

Figure 6:
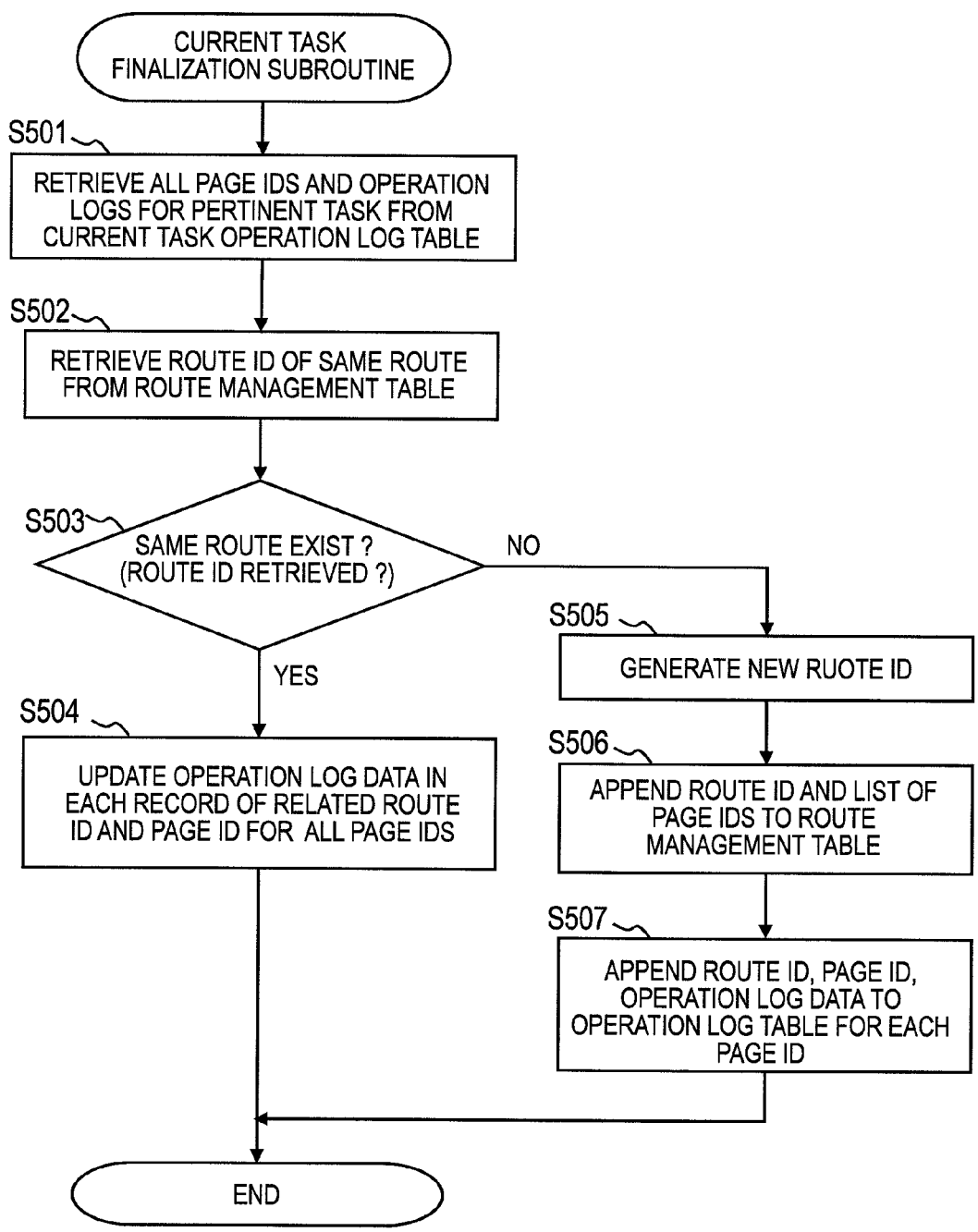
FIG. 6 is a flowchart illustrating an exemplary current task finalization subroutine in the embodiment.

FIG. 6 is a flowchart illustrating an exemplary current task finalization subroutine (S43 in FIG. 5C) in this embodiment.

First, the log server module 240 retrieves all page IDs and operation logs from the current task operation log table 144 using the particular task ID as a key (S501). Next, the log server module 240 searches the route management table 700 for routing information including the same route as the page transitions (route) directed from the page IDs retrieved at step S501 and retrieves the route ID, if such routing information exists (S502).

Next, the log server module 240 determines whether the same route exists, in other words, whether step S502 is successful to retrieve a route ID (S503). If the determination indicates that the same route exists (YES at S503), the log server module 240 updates each operation log (each record in the operation log table 720) of the related route ID and page ID for all page IDs (S504).

If the determination at step S503 indicates that the same route does not exist (NO at S503), the log server module 240 generates a new route ID (S505). The log server module 240 appends the route ID and a list of page IDs to the route management table 700 (S506). Subsequently, the module 240 appends data relating the route ID, the page ID, and operation log data to the operation log table 720 for each of the page IDs appended to the route management table 700 (S507).

As described above, the log server module 240 updates operation log data in the operation log table 720 through the processing at step S504 and appends new routing information to the route management table 700 and the operation log table 720 through the processing from step S505 to step S507.

Page Analysis

Before explaining processing of the page analysis unit 320, the transition pattern detection rule table 900 will be described. FIG. 10A illustrates an exemplary transition pattern detection rule table 900 in this embodiment and FIG. 10B is another exemplary transition pattern detection rule table 900 in this embodiment.

The transition pattern detection rule table 900 shown in FIG. 10A includes transition pattern detection rules 902 and names 903. The transition pattern detection rule table 900 shown in FIG. 10B includes transition pattern detection rules 912 and names 913. The names 903 and 913 of the transition patterns are referred to in later-described analysis using the utilization analysis policy table 1200 (1211, 1221).

The transition pattern detection rules 902 shown in FIG. 10A are based on only web page transitions without considering workflow definition. The transition pattern detection rules 912 shown in FIG. 10B are formed in consideration of the workflow definition and consist of combinations of web page transitions and information indicating whether the web page transition follows the workflow definition. The signs F shown in the transition pattern detection rules 912 denote transitions in the forward direction following the workflow definition, the signs R denote transitions in the reverse direction to the workflow definition, the sign U denotes a transition undefined in the workflow definition. Pages are denoted as a, b, and c in FIG. 10B; additionally, they may be individually labeled. For example, in a rule applied to rerouting, "a" may be labeled as branch step, "b" may be labeled as back step, and "c" may be labeled as reroute destination step. These labels are referred to in the later-described analysis using the utilization analysis policy table 1200 (1211, 1221).

The page analysis unit 320 in this embodiment refers to such a transition pattern detection rule table 900 and detects a specific transition pattern using a detection rule based on regular expressions. The manner to define detection rules and the method to detect a transition pattern are not limited to the regular expression basis but they may be a different manner to define detection rules and a different method to detect a transition pattern.

Figure 9:
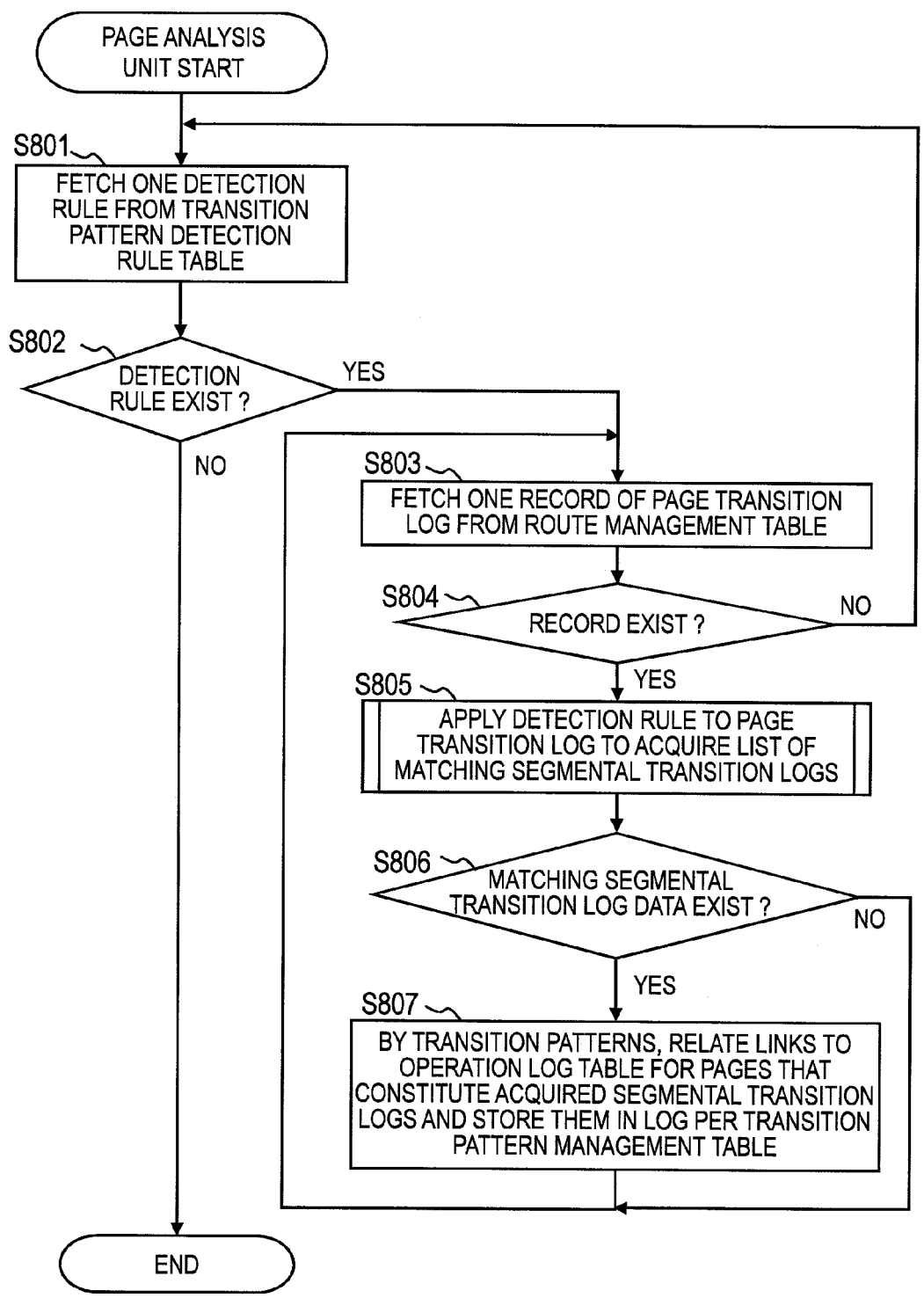
FIG. 9 is a flowchart illustrating exemplary processing of a page analysis unit in the embodiment.

FIG. 9 is a flowchart illustrating exemplary processing of the page analysis unit 320 in this embodiment.

As described above, the page analysis unit 320 refers to the transition pattern detection rule table 900 and detects a specific transition pattern from a plurality of page transition patterns.

First, the page analysis unit 320 fetches a detection rule from the transition pattern detection rule table 900 shown in FIG. 10A or 10B (S801). Next, the page analysis unit 320 determines whether a detection rule exists, in other words, whether a detection rule has been fetched (S802).

If a detection rule exists (YES at S802) as a result of the determination, the page analysis unit 320 proceeds to step S803. If a detection rule does not exist (NO at S802), the page analysis unit 320 terminates this page analysis. This step S802 is performed for every detection rule stored in the transition pattern detection rule table 900.

At step S803, the page analysis unit 320 fetches one record of page transition log (the routing information 702 in FIG. 8A) from the route management table 700. Next, the page analysis unit 320 determines whether a page transition log exists, in other words, whether the routing information has been fetched (S804).

If a record of a page transition log exists (YES at S804) as a result of the determination, the page analysis unit 320 proceeds to step S805. If no record of page transition log exists (NO at S804), it returns to step S801 to fetch the next detection rule. This step S803 is performed for every page transition log managed in the route management table 700.

At step S805, the page analysis unit 320 applies the detection rule fetched at step S801 to the page transition log fetched at step S803 to acquire a list of matching segments of the page transition log (S805). In this description, a segmental transition log is a page transition log having a transition pattern matching with a detection rule. The processing at step S805 will be specifically explained with reference to FIG. 11.

Then, the page analysis unit 320 determines whether a matching segmental transition log exists (S806). If a matching segmental transition log exists (YES at S806) as a result of the determination, the page analysis unit 320 proceeds to step S807. If no matching segmental transition log exists (NO at S806), the page analysis unit 320 returns to step S803 and fetches the next record of page transition log.

At step S807, the page analysis unit 320 relates transition patterns to links to the operation log table 720 (FIG. 8B) that manages operation logs in the pages that constitute the segmental transition logs acquired at step S805 and stores them in the log per transition pattern management table (FIG. 12B) (S807). As previously mentioned, if the same page appears in a transition pattern for a plurality of times, the page analysis unit 320 identifies the page as different pages in consideration of the positions in order of appearance to manage the operation logs.

Through the processing explained above, the page analysis unit 320 obtains segmental transition logs matching with a detection rule and operation logs for the pages that constitute the segmental transition logs.

Figure 11:
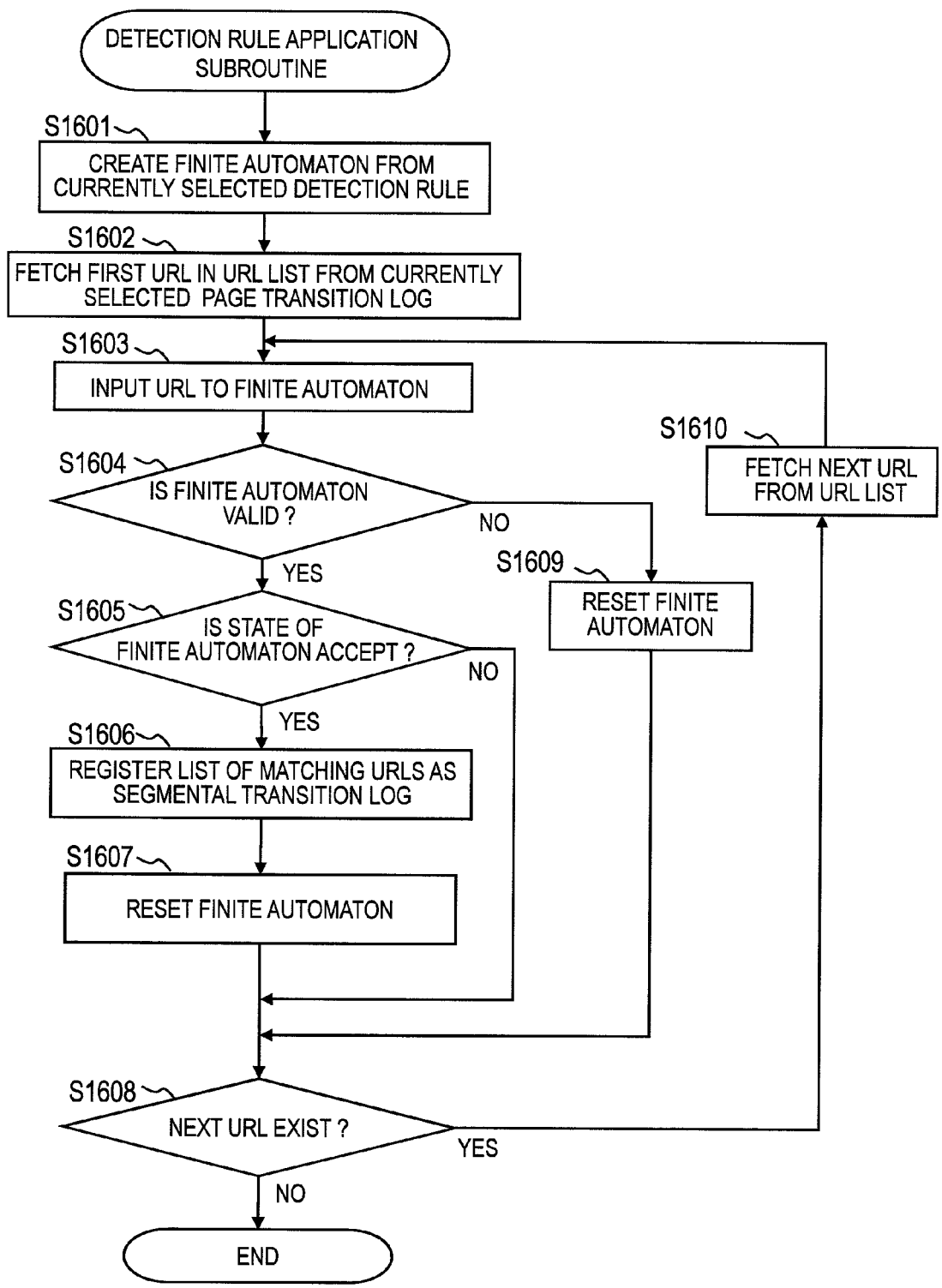
FIG. 11 is a flowchart illustrating an exemplary detection rule application subroutine in the embodiment.

FIG. 11 is a flowchart illustrating an exemplary detection rule application subroutine in this embodiment. This embodiment explains an exemplary subroutine that applies a detection rule based on regular expressions. This is typical detection rule application including creating a finite automaton from a detection rule and applying the created automaton to a URL list in the target page transition log to acquire a list of segmental transition logs matching with the detection rule.

First, the page analysis unit 320 creates a finite automaton from the detection rule fetched at step S801 in FIG. 9 (S1601). Next, the page analysis unit 320 fetches the first URL in the URL list from the page transition log fetched at S803 in FIG. 9 (S1602). Then, the page analysis unit 320 inputs the URL fetched at step S1602 to the created finite automaton (S1603).

The page analysis unit 320 determines whether the state of the finite automaton is valid (S1604). If the state of the finite automaton is determined to be valid (YES at S1604), the page analysis unit 320 proceeds to step S1605.

If the state of the finite automaton is determined to be invalid (NO at S1604), the page analysis unit 320 proceeds to step S1609 to reset the state of the finite automaton (S1609), and if the next URL exists (YES at S1608), the page analysis unit 320 fetches the next URL from the URL list (S1610) to proceed to step S1603 and repeats the comparison.

If the state of the finite automaton turns to "accept" at step S1605 (YES at S1605), the page analysis unit 320 registers a list of matching URLs as a segmental transition log (S1606), resets the finite automaton (S1607), and if the next URL exists (YES at S1608), fetches the next URL from the URL list (S1610). Then, it proceeds to step S1603 to repeat the comparison.

Log Per Transition Pattern Management Table 1000

FIGS. 12A and 12B illustrate an exemplary log per transition pattern management table 1000 in this embodiment. The log per transition pattern management table is composed of a transition pattern table 1010 (FIG. 12A) and an operation log per transition pattern management table 1020 (FIG. 12B).

The transition pattern table 1010 (FIG. 12A) manages routing information in the segmental transition logs which the page analysis unit 320 has detected through the page transition analysis illustrated in FIG. 9. The transition pattern table 1010 manages pattern IDs 1001, which are identifiers for uniquely identifying segmental transition patterns and routing information 1002 indicating segmental page transitions in relation to each other. The routing information 1002 indicates segments of page transitions.

The operation log per transition pattern management table 1020 (FIG. 12B) is a table for managing operation logs on web pages in relation to a segment transition route; it manages data in which pattern IDs 1021 corresponding to the pattern IDs 1001, page IDs 1022, and operation log data 1023 for the individual page IDs 1022 are related to one another. For example, in the case of a segment transition route (URL1→URL3→URL1→URL2) having a pattern ID of p3, operation log data 1023 for URL1 (the first time), URL3, URL1 (the second time), URL2 are related to be managed as shown in FIG. 12B.

Operation Analysis

Figure 18:
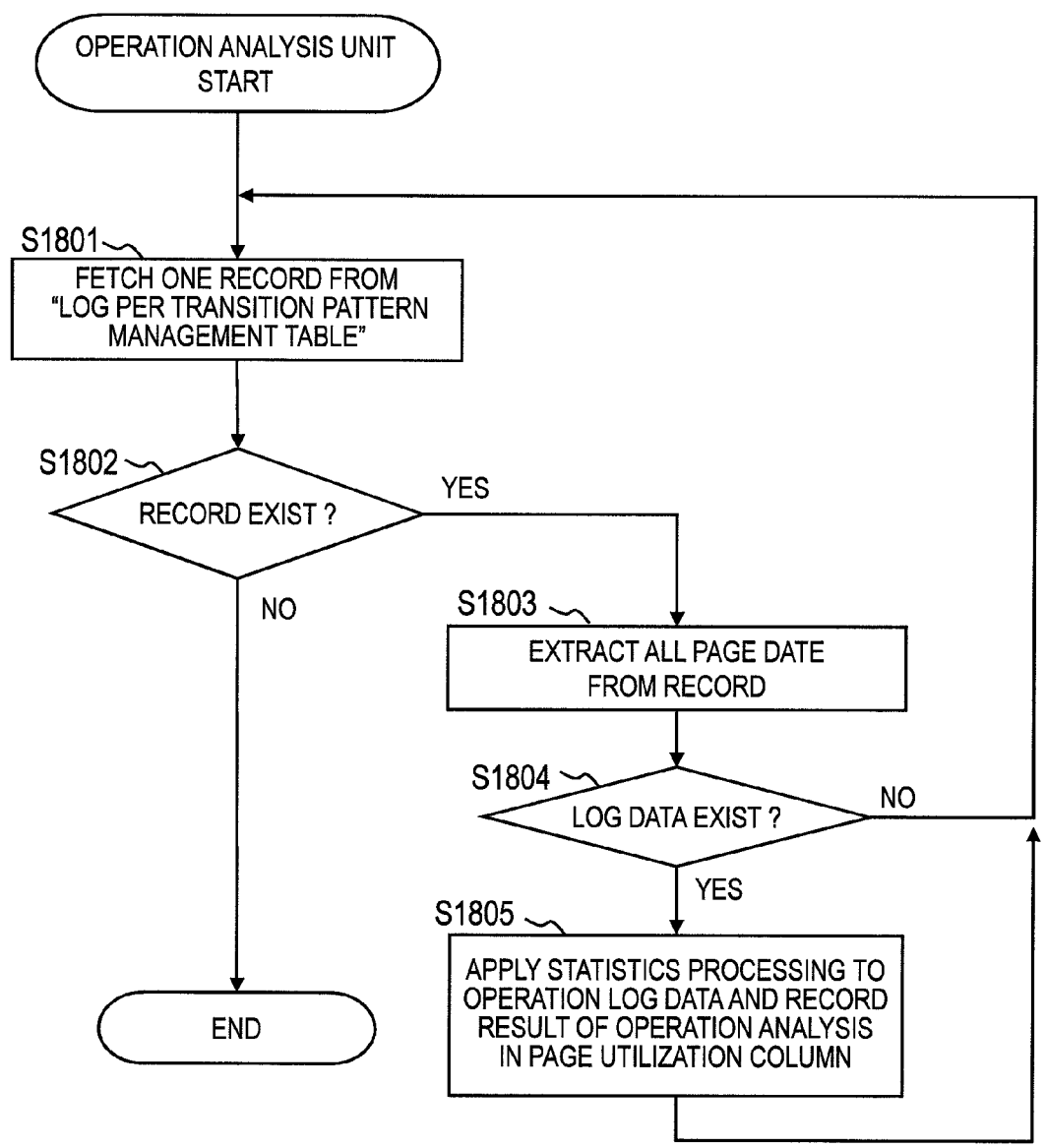
FIG. 18 is a flowchart illustrating exemplary operation analysis in this embodiment.

FIG. 18 is a flowchart illustrating exemplary processing of the operation analysis unit 321 in this embodiment. The operation analysis unit 321 first fetches one record from the operation log per transition pattern management table 1020 (S1801). This record corresponds to a list of log data for some page in some transition pattern. If a record exists (YES at S1802), the operation analysis unit 321 proceeds to step S1803, and if no record exists (NO at S1802), it terminates the processing. If a record exists, it extracts all operation log data 1023 for the page from the record (S1803). If no operation log data exists (NO at S1804), the unit 321 processes the next record. If operation log data exists (YES at S1804), the unit 321 applies statistic processing to the operation log data and records the result, which is a result of operation analysis, in the page utilization information column 1024 (S1805). The statistic processing for operation analysis relates to information that can be obtained from the operation logs, such as a page staying time (for example, the time obtained by deducting no operation time from page display time), a content peruse rate (for example, a page display rate calculated from page scroll information).

Utilization Analysis

Figure 13:
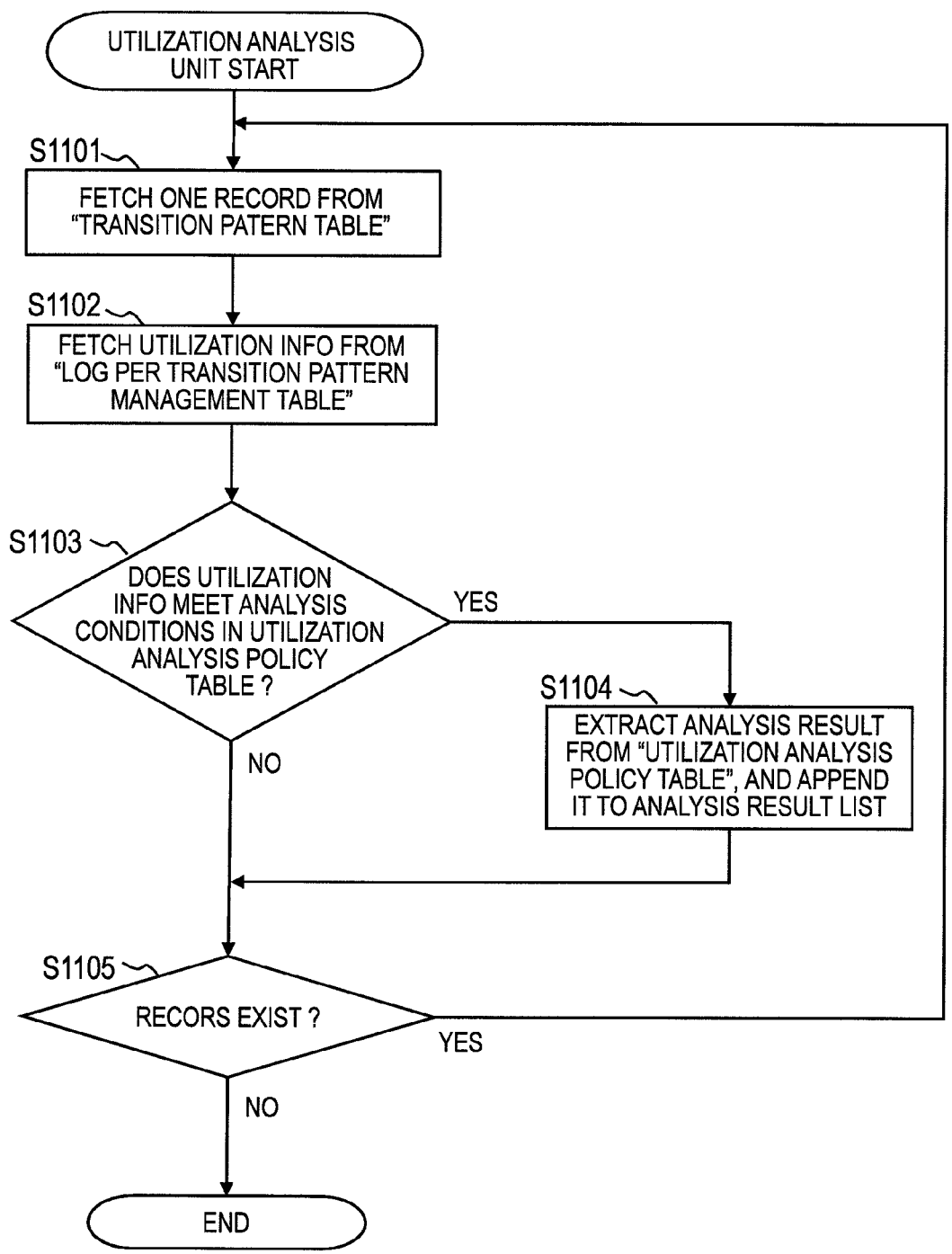
FIG. 13 is a flowchart illustrating exemplary processing of a utilization analysis unit in the embodiment.

FIG. 13 is a flowchart illustrating exemplary processing of the utilization analysis unit 322 in this embodiment. First, at step S1101, the utilization analysis unit 322 fetches one record from the transition pattern table 1010 (S1101). Next, it fetches page utilization information on the pages in the obtained transition pattern from the operation log per transition pattern management table 1020 (S1102). Then, the utilization analysis unit 322 determines whether the transition pattern and operation log data in the fetched record meet analysis conditions in the utilization analysis policy table 1200 (refer to FIG. 14) (S1103).

If the determination indicates that the fetched record meets the analysis conditions in the utilization analysis policy table 1200 (YES at S1103), the utilization analysis unit 322 extracts the result of the analysis and appends it to the analysis result list (S1104).

Subsequently, the utilization analysis unit 322 determines whether the transition pattern table 1010 includes any unprocessed record (S1105). As a result, if the transition pattern table 1010 includes an unprocessed record (YES at S1105), it returns to step S1101 as there exists a record which has not been processed yet, and processes the next record.

Through repeating steps from S1101 to S1105, utilization analysis is performed on all records in the transition pattern table 1010 and a list of problems can be obtained.

FIG. 14 illustrates an exemplary utilization analysis policy table 1200 in this embodiment.

The utilization analysis policy table 1200 shown in FIG. 14 manages data in which transition patterns 1201, utilization information 1210, and analysis results 1220 are related to one another. The transition patterns 1201 and the utilization information 1210 include conditions to determine problems. Specifically, a transition pattern 1201 is composed of an evaluation metrics 1202, a default threshold 1203, and a condition 1204; utilization information 1210 is composed of an evaluation metrics 1211, a default threshold 1212, and a condition 1213. An analysis result 1220 is composed of a target of improvement 1221 and points of improvement 1222.

For example, according to the first row of the utilization analysis policy table 1200, if the conditions that the rate of rerouting is 30% or more and the staying time at a back step is three seconds or less are met, the branch step (b) is the target of improvement and a modification is desired to solve the points of improvement 1222.

Figure 15:
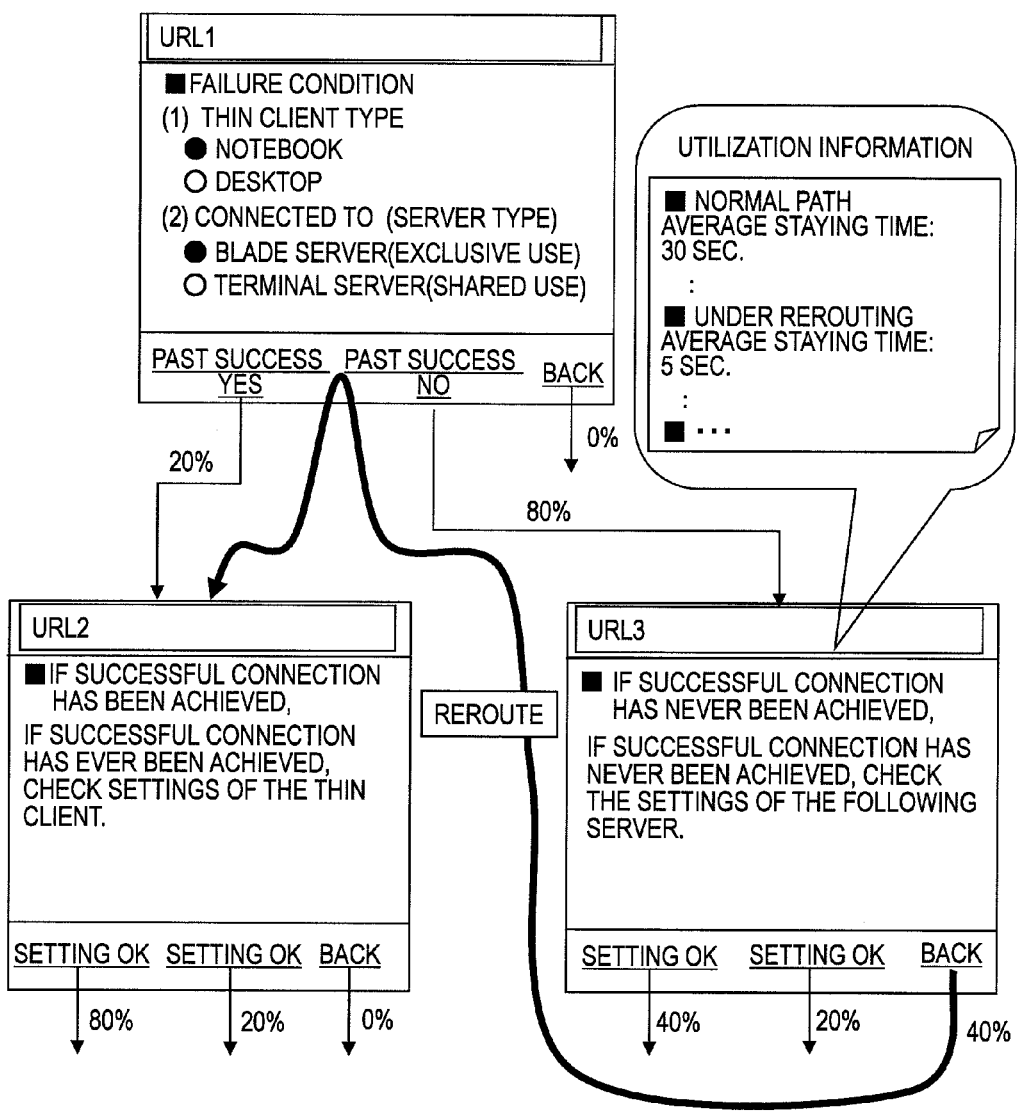
FIG. 15 is a drawing illustrating exemplary page transitions and operation logs to which the embodiment is applied.
Figure 16:
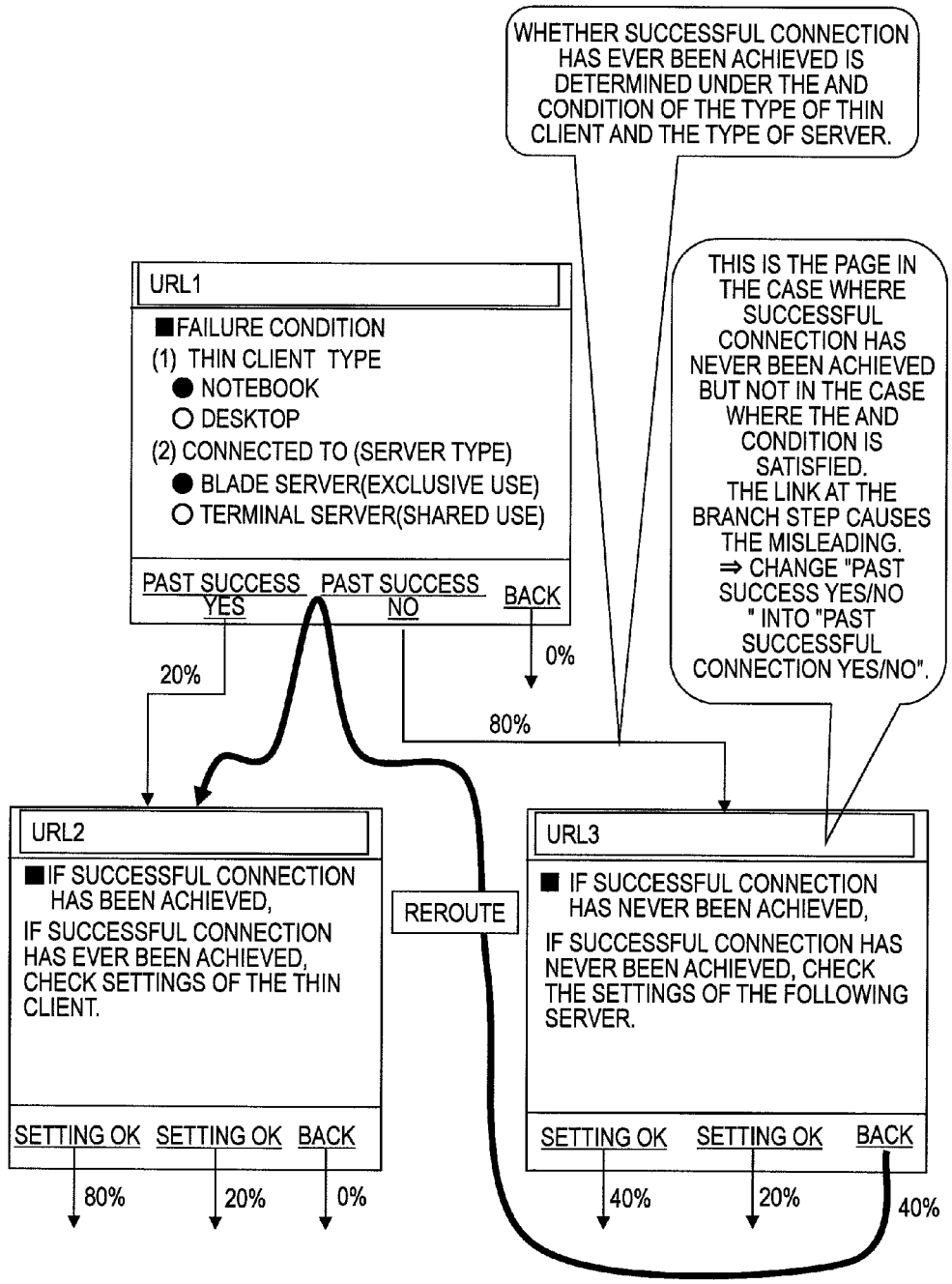
FIG. 16 is a drawing illustrating an exemplary result of analysis to which the embodiment is applied.

For example, in the case of transitions among pages shown in FIG. 15, the utilization information on the page URL3 indicates that the rate of rerouting is 40% and the average staying time under rerouting is five seconds, which meets the conditions indicated on the first row of the utilization analysis policy table 1200. Accordingly, a modification as shown in FIG. 16 is proposed.

Figure 17:
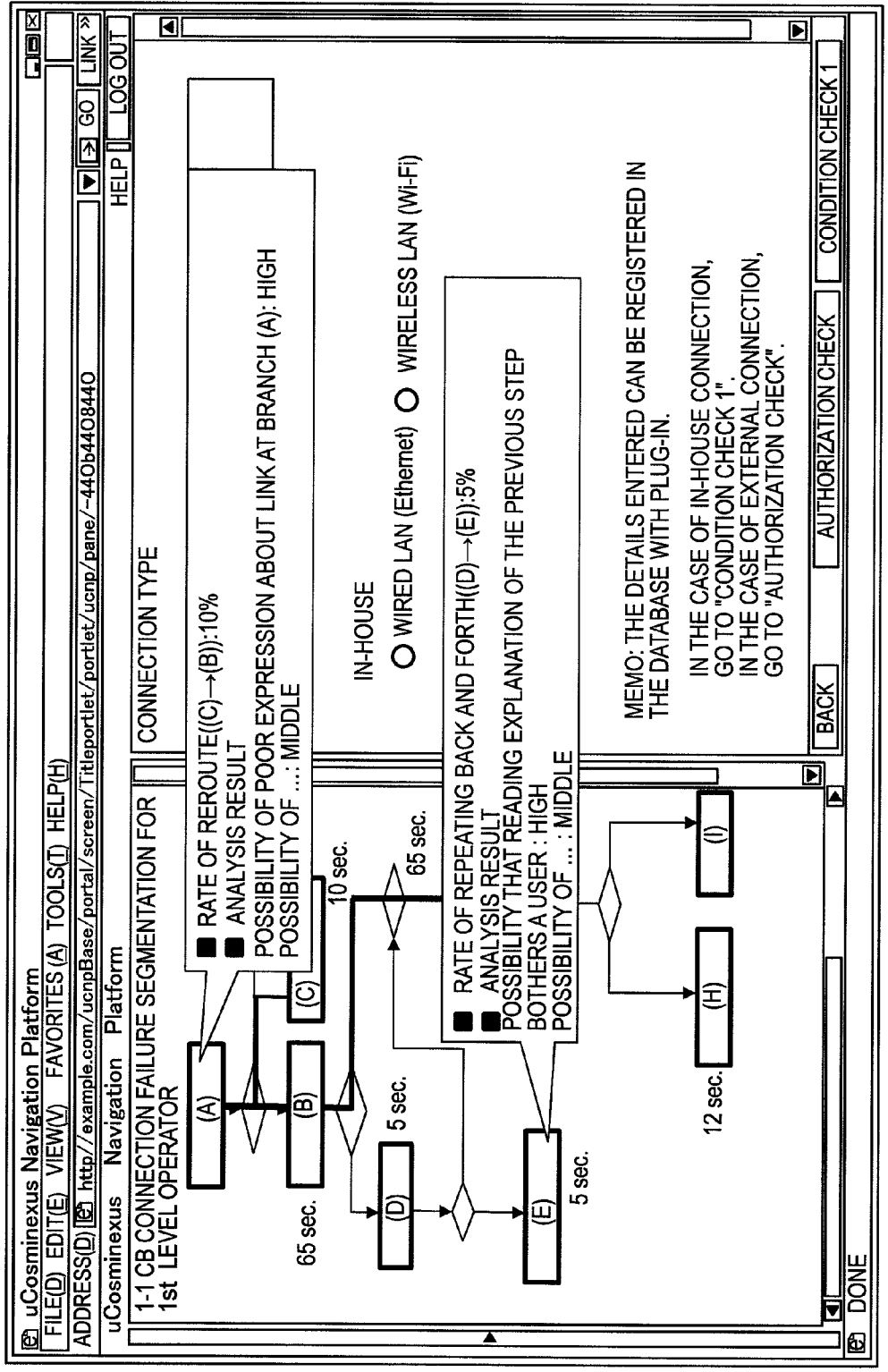
FIG. 17 is a drawing illustrating an exemplary output from a utilization output unit in this embodiment.

FIG. 17 is an exemplary output from the utilization output unit 340 in this embodiment.

The exemplary output shown in FIG. 17 displays the points of improvement on a chart of page transitions in the web application; consequently, a developer can easily realize the problems.

As explained above, as to analysis work which has been difficult in listing problems because of extensive evaluation metrics, this embodiment achieves automatic listing of problems, so that the analysis time can be significantly reduced.

The foregoing embodiment has explained analysis of a web application including a workflow definition by way of example; however, this invention can analyze web applications without explicit workflow definitions as well. One way is analysis based on information on page transitions as indicated in FIG. 10A. This method does not consider differences from the flow definition. Another way is analysis in which statistic processing is performed on the routing information of individual users (FIG. 8A) to use a route appearing with high frequency as a virtual workflow definition. This method analyzes routes deviated from the frequently used route.

What is claimed is:

1. A usability analysis method of a web application, comprising:
    acquiring a page transition log and operation logs on individual pages in the web application;
    referring to a transition pattern detection rule table holding a sequence of URLs as a specific page transition pattern including multiple occurrences of a same page, to detect the specific page transition pattern in the page transition log;
    managing the operation logs on individual pages included in the detected specific page transition pattern, in relation to the individual pages in order of appearance;
    performing statistic processing on the managed operation logs and analyzing page utilization; and
    analyzing usability based on the specific page transition pattern and the page utilization;
    wherein the analyzing includes acquiring a workflow definition defining a work procedure provided by the web application,
    wherein the transition pattern detection rule table includes a transition pattern different from a page transition pattern following the workflow definition,
    wherein the referring refers to the transition pattern detection rule table to detect the different transition pattern in the page transition log, in a case where pages are changed in the transition pattern different from the page transition pattern following the workflow definition, and
    wherein the analyzing analyzes usability based on the different page transition pattern and the page utilization.

2. The usability analysis method according to claim 1, wherein the analyzing analyzes usability using policy definitions for utilization analysis, including a first condition with regard to page transition patterns and a second condition with regard to page utilization.

3. The usability analysis method according to claim 2, further comprising:
    determining priority degrees of results of the analysis in accordance with the policy definition; and
    controlling order of displaying the results of the analysis based on the determined priority degrees, and outputting the results of the analysis.

4. The usability analysis method according to claim 2, wherein the first condition of the policy definition is that a rate of returning of a page to a previous page is equal to or higher than a predetermined threshold, and
    wherein the second condition of the policy definition is that a staying time of a page is equal to or less than a predetermined threshold, or that a perusal rate of the page is equal to or lower than a predetermined threshold.

5. The usability analysis method according to claim 1, wherein the different transition pattern includes information indicating a page transition in a direction reverse to a direction of a page transition following the workflow definition.

6. An analysis server for analyzing usability of a web application provided to a client device, the analysis server comprising:
    at least one processor and memory, configured to:
        manage a transition pattern detection rule table holding a sequence of URLs as a specific page transition pattern including multiple occurrences of a same page;
        compare page transition logs with the transition pattern detection rule table to detect the specific transition pattern in the page transition logs;
        acquire and record operation logs on individual pages in the detected specific transition pattern in log management information, in relation to the individual pages in order of appearance;
        perform statistic processing on the managed operation logs and analyze page utilization; and
        analyze the web application based on the specific transition pattern and the page utilization;
    wherein the analyzing includes acquiring a workflow definition defining a work procedure provided by the web application,
    wherein the transition pattern detection rule table includes a transition pattern different from a page transition pattern following the workflow definition,
    wherein the managing refers to the transition pattern detection rule table to detect the different transition pattern in the page transition log, in a case where pages are changed in the transition pattern different from the page transition pattern following the workflow definition, and
    wherein the analyzing analyzes usability based on the different page transition pattern and the page utilization.

7. The analysis server according to claim 6, comprising a web server for providing the client device with a web application.

8. A non-transitory, computer-readable medium embodying a program executed in an analysis server for analyzing usability of a web application provided to a client device, the program being configured to cause the analysis server to perform:
    acquiring a page transition log and operation logs on individual pages in the web application;

referring to a transition pattern detection rule table holding a sequence of URLs as a specific transition pattern including multiple occurrences of a same page, to detect the specific page transition pattern in the page transition log;

managing the operation logs on individual pages in the detected specific transition pattern, in relation to the individual pages in order of appearance;

performing statistic processing on the managed operation logs and analyzing page utilization; and analyzing usability based on the specific transition pattern and the page utilization;

wherein the analysis server is caused to manage a workflow definition defining a work procedure provided by the web application, wherein the transition pattern detection rule table includes a transition pattern different from a page transition pattern following the workflow definition, and wherein the referring refers to the transition pattern detection rule table to detect the different transition pattern in the page transition log, in a case where pages are changed in the transition pattern different from the page transition pattern following the workflow definition, and wherein the analyzing analyzes usability based on the different page transition pattern and the page utilization.

9. The non-transitory, computer-readable medium according to claim 8, wherein the analysis server is caused to manage policy definitions for utilization analysis, including a first condition with regard to page transition patterns and a second condition with regard to page utilization, and wherein the analyzing analyzes usability using the policy definitions for utilization analysis, including the first condition with regard to page transition patterns and the second condition with regard to page utilization.

* * * * *